US012633250B2

(12) United States Patent
Jang et al.

(10) Patent No.: US 12,633,250 B2
(45) Date of Patent: May 19, 2026

(54) GATE DRIVING CIRCUIT AND DISPLAY DEVICE INCLUDING THE SAME

(71) Applicant: LG Display Co., Ltd., Seoul (KR)

(72) Inventors: Min June Jang, Paju-si (KR); Mi Young Son, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/823,393

(22) Filed: Sep. 3, 2024

(65) Prior Publication Data

US 2025/0239208 A1 Jul. 24, 2025

(30) Foreign Application Priority Data

Jan. 24, 2024 (KR) ........................ 10-2024-0011039

(51) Int. Cl.
*G09G 3/32* (2016.01)
*G09G 3/3233* (2016.01)
*G09G 3/3266* (2016.01)

(52) U.S. Cl.
CPC ............. *G09G 3/32* (2013.01); *G09G 3/3233* (2013.01); *G09G 3/3266* (2013.01); *G09G 2310/0267* (2013.01); *G09G 2310/0275* (2013.01); *G09G 2310/08* (2013.01)

(58) Field of Classification Search
CPC ............. G09G 3/32; G09G 2310/0267; G09G 2310/0275; G09G 2310/08; G09G 3/3233; G09G 3/3266
USPC .................................................... 345/204, 76
See application file for complete search history.

(56) References Cited

U.S. PATENT DOCUMENTS

| | | | | |
|---|---|---|---|---|
| 9,875,706 B1* | 1/2018 | Gong | ........................ | G09G 3/36 |
| 11,005,475 B1* | 5/2021 | Hashimoto | .......... | H03K 19/094 |
| 11,295,672 B2* | 4/2022 | Na | ........................ | G09G 3/3233 |
| 12,170,067 B2* | 12/2024 | Han | ........................ | G09G 3/32 |
| 12,499,819 B2* | 12/2025 | Jang | ........................ | G09G 3/32 |
| 12,499,844 B2* | 12/2025 | Jang | ........................ | G09G 3/32 |
| 2015/0015554 A1* | 1/2015 | Kim | ..................... | G09G 3/3266 345/208 |
| 2019/0073987 A1* | 3/2019 | Lin | ........................... | G06T 1/60 |

(Continued)

FOREIGN PATENT DOCUMENTS

| | | |
|---|---|---|
| KR | 10-2013-0000020 A | 1/2013 |
| KR | 10-2019-0056671 A | 5/2019 |

*Primary Examiner* — Jason M Mandeville
(74) *Attorney, Agent, or Firm* — Birch, Stewart, Kolasch & Birch, LLP

(57) ABSTRACT

A display device can include a display panel having a plurality of sub-pixels disposed thereon, and a gate driving circuit configured to output a gate signal to the plurality of sub-pixels. The gate driving circuit includes a pull-up transistor controlled by a voltage level of a Q-node, a pull-down transistor configured by a voltage level of a QB-node, a pump capacitor electrically connected between the Q-node and a clock signal input terminal, a pump transistor electrically connected between the pump capacitor and the Q-node and controlled by the gate signal output to a gate line, a clock transistor electrically connected between the pump capacitor and the clock signal input terminal and controlled by a voltage level of a start signal input node, and a direction selection circuit configured to output a forward start signal or a backward start signal to the start signal input node.

12 Claims, 23 Drawing Sheets

(56) References Cited

U.S. PATENT DOCUMENTS

| | | | | |
|---|---|---|---|---|
| 2022/0148502 | A1* | 5/2022 | Kim | G09G 3/3266 |
| 2023/0215377 | A1* | 7/2023 | Han | G09G 3/3266 345/690 |

* cited by examiner

<Input Voltage Level>
High : 12V
Low : -12V

EQ Node Simulation Waveform of Comparative Example

EM Output Simulation Waveform of Comparative Example

<Input Voltage Level>
High : 12V
Low : -12V

EQ Node Simulation Waveform of Embodiment

EM Output Simulation Waveform of Embodiment

<Input Voltage Level>
High : 12V
Low : -12V

EQ Node Simulation Waveform of Second Embodiment

EM Output Simulation Waveform of Second Embodiment

GATE DRIVING CIRCUIT AND DISPLAY DEVICE INCLUDING THE SAME

CROSS-REFERENCE TO RELATED APPLICATIONS

This application claims priority to Korean Patent Application No. 10-2024-0011039, filed in the Republic of Korea on Jan. 24, 2024, the entire contents of which is hereby expressly incorporated by reference into the present application.

BACKGROUND

Field

The present disclosure relates to a gate driving circuit and a display device including the same.

Discussion of the Related Art

A display device can include a plurality of sub-pixels disposed at a panel, and various circuits configured to drive the plurality of sub-pixels. For example, the display device can include a gate driving circuit configured to control driving timings of the plurality of sub-pixels, and a data driving circuit configured to supply a data voltage corresponding to image data to the plurality of sub-pixels.

The gate driving circuit can be constituted by a plurality of switches and a plurality of lines configured to supply a gate pulse to a plurality of gate lines. The gate driving circuit as mentioned above can be directly formed on the same substrate, together with sub-pixels of the display panel. Since the gate driving circuit is disposed in a bezel area outside an active area, an increase in the size of the bezel area is inevitable when the gate driving circuit is more complex.

To this end, research is being continuously conducted in order to maximize design area efficiency by reducing a design area through simplification of the gate driving circuit while securing desired performance of the gate driving circuit.

SUMMARY OF THE DISCLOSURE

Accordingly, the present disclosure is directed to a gate driving circuit and a display device including the same that substantially obviate one or more problems due to limitations and disadvantages of the related art.

Aspects of the present disclosure provide a gate driving circuit capable of maximizing design area efficiency by reducing a design area through simplification of the gate driving circuit while securing desired performance of the gate driving circuit, and also provide a display device including the gate driving circuit.

Objects of the present disclosure are not limited to the above-described object, and other objects of the present disclosure not yet described will be more clearly understood by those skilled in the art from the following detailed description.

To achieve these objects and other advantages and in accordance with the purpose of the disclosure, as embodied and broadly described herein, a display device includes a display panel having a plurality of sub-pixels disposed thereon, and a gate driving circuit configured to output a gate signal to the plurality of sub-pixels, wherein the gate driving circuit includes a pull-up transistor controlled by a voltage level of a Q-node, a pull-down transistor configured by a voltage level of a QB-node, a pump capacitor electrically connected between the Q-node and an input terminal for a clock signal, a pump transistor electrically connected between the pump capacitor and the Q-node and controlled by the gate signal output to a gate line, a clock transistor electrically connected between the pump capacitor and the input terminal for the clock signal and controlled by a voltage level of a start signal input node, and a direction selection circuit configured to output a forward start signal or a backward start signal to the start signal input node.

According to one or more aspects of the present disclosure, the direction selection circuit can apply the forward start signal to the start signal input node when a forward low voltage is input thereto, and can apply the backward start signal to the start signal input node when a backward low voltage is input thereto.

According to one or more aspects of the present disclosure, the gate driving circuit can further include a first transistor electrically connected between the Q-node and the start signal input node and controlled by a voltage level of the clock signal.

According to one or more aspects of the present disclosure, the direction selection circuit can include a forward direction selection transistor connected between a line for the forward start signal and the start signal input node, the forward direction selection transistor including a gate configured to receive the forward low voltage, and a backward direction selection transistor connected between a line for the backward start signal and the start signal input node, the backward direction selection transistor including a gate configured to receive the backward low voltage.

According to one or more aspects of the present disclosure, a gate node of the pump transistor can be electrically connected to a node between the pump transistor and the pump capacitor.

According to one or more aspects of the present disclosure, the gate driving circuit can further include a feed transistor electrically connected between a gate node of the pump transistor and an input terminal for a low drive voltage and controlled by a voltage level of the gate signal output to the gate line.

According to one or more aspects of the present disclosure, the display panel can include a substrate at which the gate driving circuit is formed at least one in number among pixel areas formed with the plurality of sub-pixels.

According to one or more aspects of the present disclosure, each of the plurality of sub-pixels can include a light emitting element, a driving transistor configured to supply a drive current to the light emitting element, and a plurality of switching transistors configured to control driving timings of the driving transistor and the light emitting element. The gate signal can be supplied to control, among the plurality of plurality of switching transistor, a switching transistor configured to control a turn-on period of the light emitting element.

In another aspect of the present disclosure, a gate driving circuit includes a pull-up transistor controlled by a voltage level of a Q-node and electrically connected between an input terminal for a low drive voltage and an output terminal for a gate signal, a pull-down transistor controlled by a voltage level of a QB-node and electrically connected between an input terminal for a high drive voltage and the output terminal for the gate signal, a pump capacitor electrically connected between the Q-node and an input terminal for a gate clock signal, a pump transistor electrically connected between the pump capacitor and the Q-node and controlled by the gate signal output to a gate line, a clock transistor electrically connected between the pump capacitor and the input terminal for the gate clock signal and controlled by a voltage level of a start signal input node, a first transistor electrically connected between the Q-node and the start signal input node and controlled by a voltage level of the gate clock signal, and a direction selection circuit configured to output a forward start signal or a backward start signal to the start signal input node.

According to one or more aspects of the present disclosure, the direction selection circuit can include a forward direction selection transistor connected between a line for the forward start signal and the start signal input node, the forward direction selection transistor including a gate configured to receive a forward low voltage, and a backward direction selection transistor connected between a line for the backward start signal and the start signal input node, the backward direction selection transistor including a gate configured to receive a backward low voltage.

In another aspect of the present disclosure, a display device includes a display panel having a plurality of sub-pixels disposed thereon, and a gate driving circuit configured to output a gate signal to the plurality of sub-pixels, wherein the gate driving circuit includes a pull-up transistor controlled by a voltage level of a Q-node, a pull-down transistor configured by a voltage level of a QB-node, a pump capacitor electrically connected between the Q-node and an input terminal for a clock signal, a pump transistor electrically connected between the pump capacitor and the Q-node and controlled by the gate signal output to a gate line, a clock transistor electrically connected between the pump capacitor and an input terminal for an AC signal and controlled by a voltage level of a start signal input node, a first transistor electrically connected between the Q-node and the start signal input node and controlled by a voltage level of the clock signal, and a direction selection circuit configured to output a forward start signal or a backward start signal to the start signal input node.

According to one or more aspects of the present disclosure, the direction selection circuit can include a forward direction selection transistor connected between a line for the forward start signal and the start signal input node, the forward direction selection transistor including a gate configured to receive a forward low voltage, and a backward direction selection transistor connected between a line for the backward start signal and the start signal input node, the backward direction selection transistor including a gate configured to receive a backward low voltage.

According to one or more aspects of the present disclosure, a voltage of the Q-node can be boosted when the forward start signal or the backward start signal is applied at a low level, the clock signal is applied at a low level, and the AC signal has a low level.

According to one or more aspects of the present disclosure, the AC signal can have a cycle corresponding to 1/N of a cycle of the clock signal (N being a multiple of 2).

According to one or more aspects of the present disclosure, a voltage level of the Q-node can be varied at a time when the AC signal transitions from a high level to a low level.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure. In the drawings.

DETAILED DESCRIPTION OF THE EMBODIMENTS

Figure 1:
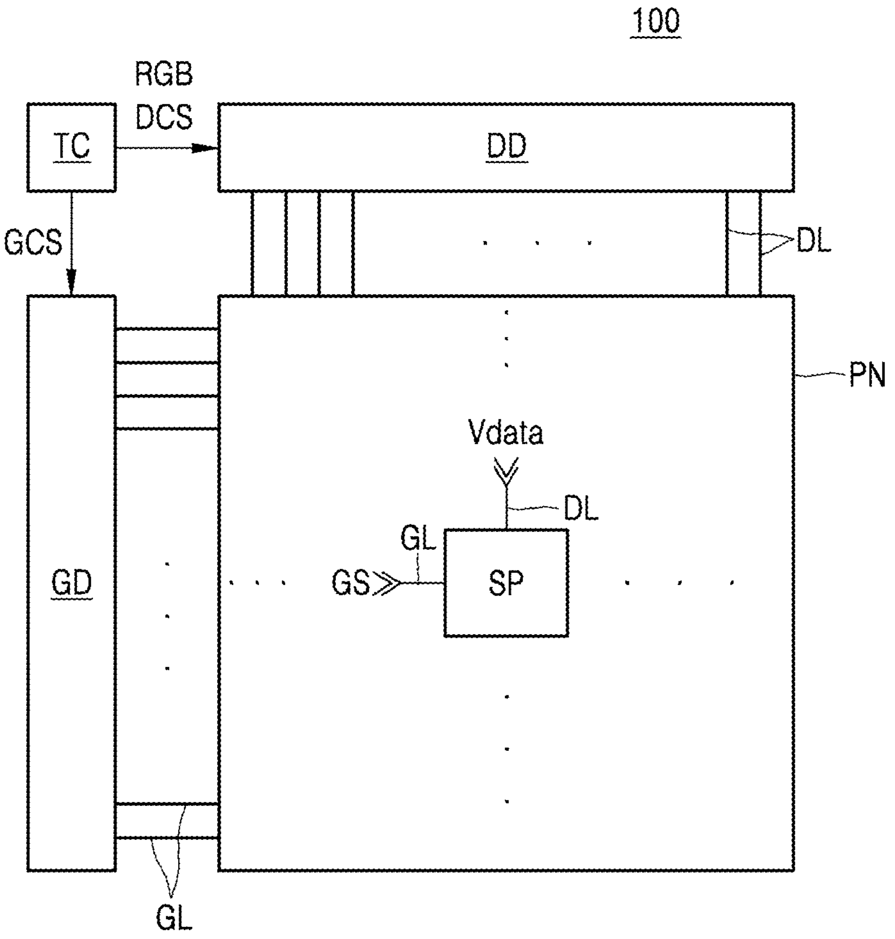
FIG. 1 is a schematic configuration diagram of a display device according to an aspect of the present disclosure.

Advantages and features of the present disclosure and methods for achieving the same will be made clear from aspects described below in detail with reference to the accompanying drawings. The present disclosure may, however, be embodied in many different forms, and should not be construed as being limited to the aspects set forth herein. Here, aspects of the present disclosure are provided so that the present disclosure can be sufficiently thorough and complete to assist those skilled in the art in fully understanding the scope of the present disclosure.

The shape, size, ratio, angle, number and the like shown in the drawings to illustrate the aspects of the present disclosure are only for illustration and are not limited to the contents shown in the drawings. Wherever possible, the same reference numbers will be used throughout the drawings to refer to the same or like parts. In the following description, detailed descriptions of technologies or configurations related to the present disclosure can be omitted so as not to unnecessarily obscure the subject matter of the present disclosure. When terms such as "including", "having" and "comprising" are used throughout the disclosure, an additional component can be present, unless "only" is used. A component described in a singular form encompasses components in a plural form unless particularly stated otherwise.

It should be interpreted that the components included in the aspect of the present disclosure include an error range, although there is no additional particular description thereof.

In describing a variety of aspects of the present disclosure, when terms for positional relationship such as "on", "above", "under" and "next to" are used, at least one intervening element can be present between two elements unless "immediately" or "directly" is used. Further, the term "can" fully encompasses all the meanings and coverages of the term "may."

In the meantime, although terms including an ordinal number, such as first or second, can be used to describe a variety of constituent elements, the constituent elements are not limited to the terms, and the terms are used only for the purpose of discriminating one constituent element from other constituent elements. For example, without departing from the scope of the present disclosure, a first constituent element can be named a second constituent element.

In addition, a pixel circuit of a display device, which will be described hereinafter, can include a plurality of transistors. Such transistors can be implemented by an oxide thin film transistor (TFT) including an oxide semiconductor, a low-temperature polysilicon (LTPS) TFT including LTPS, etc. Each of such transistors can be implemented by a p-channel TFT or an n-channel TFT.

Such a transistor is a three-electrode element including a gate, a source, and drain. The source is an electrode configured to supply carriers to the transistor. In the transistor, carriers flow from the source. The drain is an electrode configured to allow carriers in the transistor to be discharged to an outside of the transistor. Flow of carriers in the transistor proceeds from the source to the drain. In an n-channel transistor, carriers are electrons and, as such, a source voltage is lower than a drain voltage in order to enable electrons to flow from the source to the drain. The direction of current in the n-channel transistor proceeds from the drain to the source. In a p-channel transistor (for example, a PMOS transistor), carriers are holes and, as such, a source voltage is higher than a drain voltage in order to enable holes to flow from the source to the drain. In the p-channel transistor, current flows from the source to the drain because holes flow from the source to the drain. Here, it should be noted that the source and the drain in the transistor are not fixed. For example, the source and the drain can be interchanged in accordance with an application voltage. Accordingly, the present disclosure is not limited due to the source and the drain of the transistor. In the following description, the source and the drain of the transistor will be referred to as first and second electrodes.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor. The transistor is turned on in response to the gate-on voltage, and is turned off in response to the gate-off voltage. In an n-channel transistor, the gate-on voltage can be a gate-high voltage VGH, and the gate-off voltage can be a gate-low voltage VGL. In a p-channel transistor, the gate-on voltage can be the gate-low voltage VGL, and the gate-off voltage can be the gate-high voltage VGH.

Throughout the disclosure, the same reference numerals designate the same constituent elements, respectively. The area and thickness of each constituent element shown in the accompanying drawings are illustrated for convenience of description, and the present disclosure is not limited to the illustrated area and thickness of the constituent element.

The respective features of various aspects according to the present disclosure can be partially or entirely joined or combined and technically variably related or operated, and the aspects can be implemented independently or in combination.

Hereinafter, aspects of the present disclosure will be described in detail with reference to the accompanying drawings. In the following description of the present disclosure, a detailed description of known functions and configurations incorporated herein will be omitted when it can obscure the subject matter of the present disclosure. All the components of each circuit and each display device according to all embodiments of the present disclosure are operatively coupled and configured.

FIG. 1 is a schematic configuration diagram of a display device according to an aspect of the present disclosure.

For convenience of description, FIG. 1 shows a display panel PN, a gate driver GD, a data driver DD, and a timing controller TC, among various constituent elements of a display device 100. Positions of the display panel PN, the gate driver GD, the data driver DD, and the timing controller TC are only positions given for convenience of illustration, and can be varied.

Referring to FIG. 1, the display device 100 includes the display panel PN, which includes a plurality of sub-pixels SP, the gate driver GD and the data driver DD, which are configured to supply various signals to the display panel PN, and the timing controller TC, which is configured to control the gate driver GD and the data driver DD.

The display panel PN has a configuration for displaying an image to the user, and includes the plurality of sub-pixels SP. In the display panel PN, a plurality of gate lines GL and a plurality of data lines DL intersect each other, and each of the plurality of sub-pixels SP is connected to corresponding ones of the gate lines SL and the data lines DL. In addition, each of the plurality of sub-pixels SP can be connected to power lines such as a high-level power line, a low-level power line, a reference power line, etc.

Each of the plurality of sub-pixels SP is a minimum unit of a configuration constituting a screen. Each of the plurality of sub-pixels SP includes a light emitting element, and a sub-pixel circuit configured to drive the light emitting element. A plurality of light emitting elements can be defined to have different types in accordance with different kinds of the display panel PN. For example, when the display panel PN is an inorganic light emitting display panel, each light emitting element can be a light emitting diode (LED) or a micro-light emitting diode (micro-LED).

The gate driver GD supplies a plurality of gate signals GS to the plurality of gate lines GL in accordance with a plurality of gate control signals GCS supplied from the timing controller TC. Although the gate driver GD is shown in FIG. 1 as being disposed at one side of the display panel PN as a single block while being spaced apart from the side of the display panel PN, the number and disposition/location of the gate driver GD are not limited thereto.

The data driver DD converts image data RGB input thereto from the timing controller TC into a data voltage Vdata, using a reference gamma voltage, in accordance with a plurality of data control signals DCS supplied from the timing controller TC. The data driver DD can supply the converted data voltage Vdata to the plurality of data lines DL.

The timing controller TC arranges the image data RGB input thereto from an outside thereof, and supplies the arranged image data RGB to the data driver DD. The timing controller TC can generate the gate control signal GCS and the data control signal DCS using synchronization signals input thereto from the outside thereof, for example, a dot clock signal, a data enable signal, and horizontal/vertical synchronization signals.

The timing controller TC supplies the gate control signal GCS and the data control signal DCS generated as described above to the gate driver GD and the data driver DD, respectively, thereby controlling the gate driver GD and the data driver DD.

Hereinafter, a configuration of the display panel PN of the display device 100 according to an aspect of the present disclosure will be described in more detail.

Figure 2:
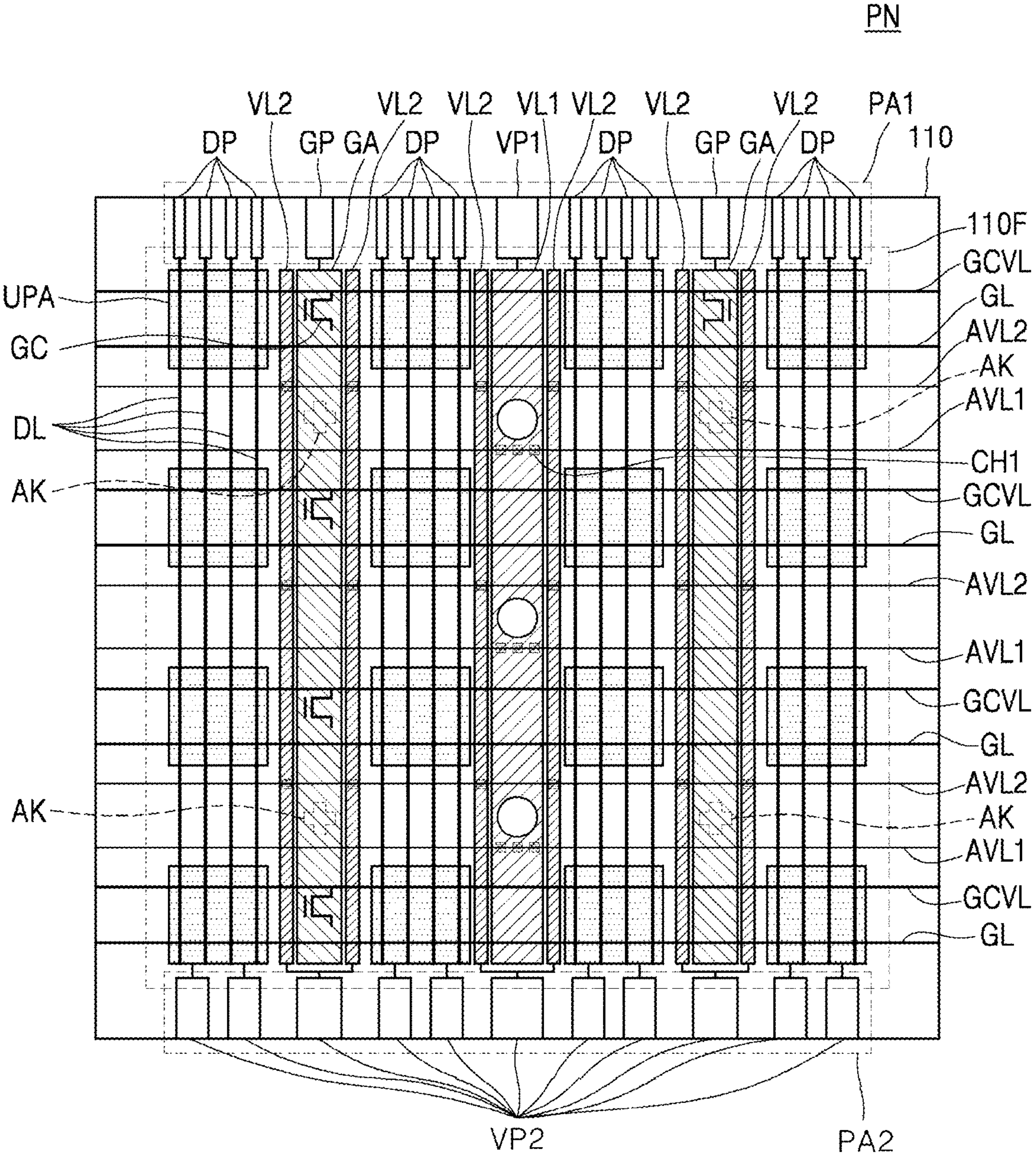
FIG. 2 is a schematic layout view of a display panel included in the display device according to the aspect of the present disclosure.
Figure 3:
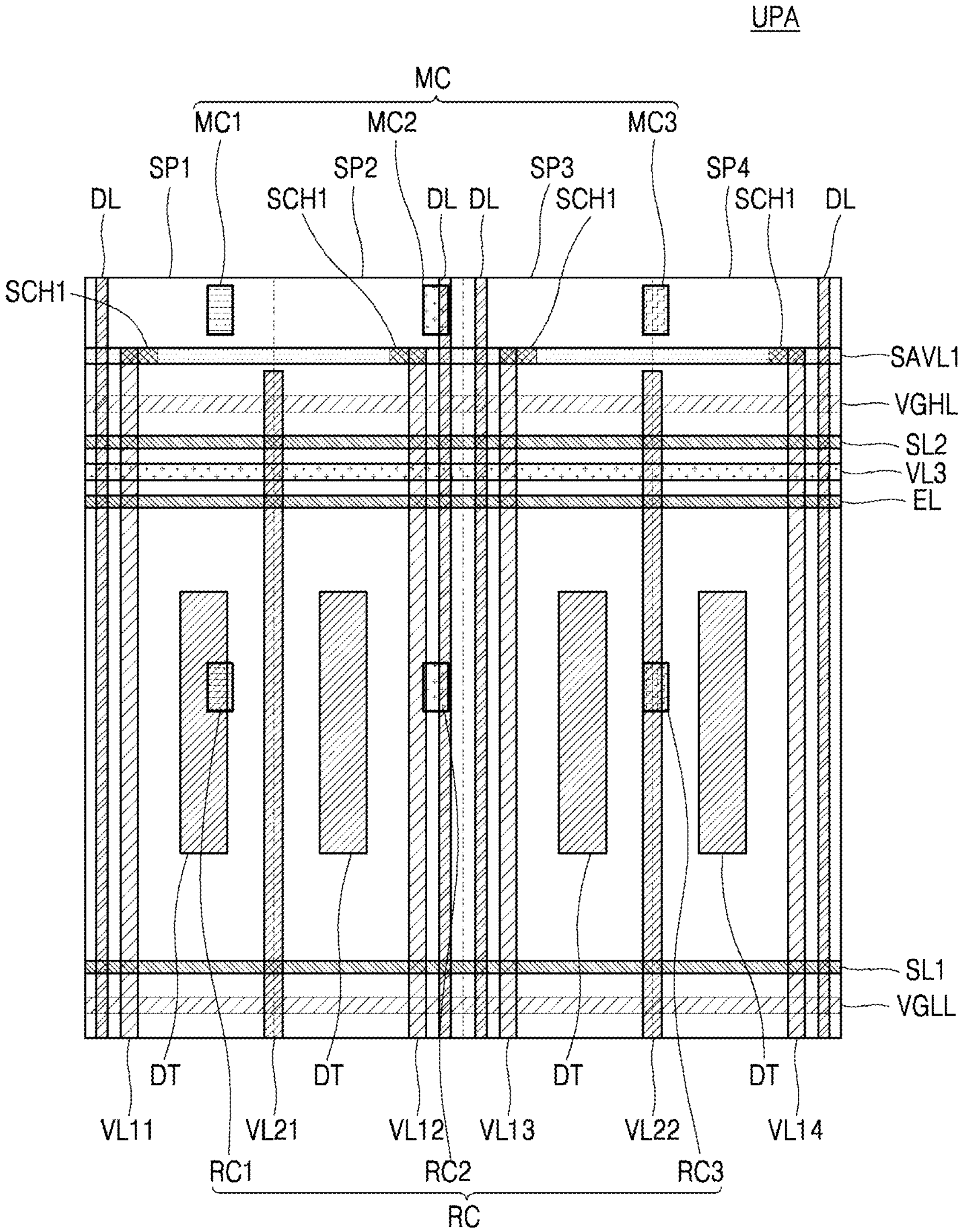
FIG. 3 is an enlarged layout view of one sub-pixel included in the display device according to the aspect of the present disclosure.

FIG. 2 is a schematic layout view of a display panel included in the display device according to the aspect of the present disclosure. For convenience of description, FIG. 2 shows a substrate 110, a plurality of unit pixel areas UPA, a plurality of pads VP1, VP2, DP, and GP, and a plurality of lines, among various constituent elements of the display device 100. FIG. 3 is a layout view of one unit pixel area included in the display device according to the aspect of the present disclosure.

Referring to FIGS. 2 and 3, the substrate 110 is a configuration for supporting various constituent elements included in a display panel PN. The substrate 110 can be made of an insulating material. For example, the substrate 110 can be made of glass, resin, or the like. Otherwise, the substrate 110 can be formed through inclusion of a polymer or plastic, or can be made of a material having flexibility.

The substrate 110 can be divided into an active area and a non-active area. The active area is an area on which an image is displayed. The active area can include a plurality of unit pixel areas UPA. The plurality of unit pixel areas UPA can each include at least two sub-pixels SP. Although each unit pixel area UPA is shown as including four sub-pixels SP1, SP2, SP3, and SP4, the present disclosure is not limited thereto. The four sub-pixels include a first sub-pixel SP1, a second sub-pixel SP2, a third sub-pixel SP3, and a fourth sub-pixel SP4. Here, for convenience of description, the unit pixel area UPA can be referred to as a "pixel area", and the non-active area can be referred to as a "non-pixel area".

Each of the plurality of sub-pixels is an individual unit of a configuration for emitting light. A plurality of light emitting elements MC and RC and a sub-pixel circuit are disposed at each of the plurality of sub-pixels. Each sub-pixel unit including the four sub-pixels SP1, SP2, SP3, and SP4 can include sub-pixels configured to emit at least two colors among a red sub-pixel, a green sub-pixel, and a blue sub-pixel or can include sub-pixels configured to emit at least two colors among a red sub-pixel, a green sub-pixel, a blue sub-pixel, and a white sub-pixel, without being limited thereto.

The sub-pixel unit can also include at least two sub-pixels each including a light emitting element having a lowest efficiency among a red light emitting element, a green light emitting element, and a blue light emitting element. When the light emitting elements are LEDs, the red light emitting element exhibits low efficiency.

Meanwhile, the sub-pixel circuit can include a drive transistor DT configured to supply a drive current to the plurality of light emitting elements MC and RC. A part of the plurality of light emitting elements MC and RC can be disposed to overlap with the drive transistor DT.

The display device 100 according to the aspect of the present disclosure can include first and second sub-pixels SP1 and SP2 configured to emit red (R) light, a third sub-pixel SP3 configured to emit green (G) light, and a fourth sub-pixel SP4 configured to emit blue (B) light. The first sub-pixel SP1, the second sub-pixel SP2, the third sub-pixel SP3, and the fourth sub-pixel SP4 can be disposed in a row direction in parallel.

As described above, the active area is an area in which the plurality of sub-pixel units is disposed, whereas the non-active area is an area in which no image is displayed. Here, the non-active area can be an area in which no sub-pixel unit is disposed, for example, an area in which the gate driver GD configured to drive the plurality of sub-pixels SP disposed in the active area, lines, pads configured to apply signals to the lines, etc. are disposed.

The gate driver GD supplies a gate signal to the plurality of sub-pixels SP through gate lines GL. The gate signal includes a scan signal and an emission signal.

The scan signal is supplied through a scan line SL, and the emission signal is supplied through an emission line EL. In addition, the scan line SL and the emission line EL can be collectively referred to as a "gate line GL". If needed, two or more scan lines SL can be provided. The following description will be given in conjunction with an example in which the scan line SL includes a first scan line SL1 and a second scan line SL2.

The gate driver GD can include a scan driver configured to supply a scan signal and an emission driver configured to supply an emission signal.

In the display device 100 according to the aspect of the present disclosure, the gate driver GD is divided into a plurality of parts on the substrate 110 such that the divided parts are disposed in gate driving circuit areas GA among the plurality of unit pixel areas UPA, respectively.

In the display device 100 according to the aspect of the present disclosure, each light emitting element can be a light emitting diode (LED) which can be an inorganic light emitting element. Since the LED exhibits excellent luminous efficacy, the area occupied by the LED, for example, each of the light emitting elements MC and RC, per unit pixel area UPA can be very small. Accordingly, a sub-pixel circuit and at least one light emitting element connected to the sub-pixel circuit, for example, the light emitting elements MC and RC, can be disposed at each of the sub-pixels SP1, SP2, SP3, and SP4, and a gate driving circuit GC can be disposed in the non-active area per at least one unit pixel area UPA.

Meanwhile, the light emitting elements MC and RC can be disposed at the substrate 110 through a transfer process. In this case, an alignment key AK configured to align the light emitting elements MC and RC with the substrate 110 can be disposed in each gate driving circuit area GA. The alignment key AK can be disposed among the gate driving circuits GC disposed in a column direction in each gate driving circuit area GA.

In the case of FIG. 2, each gate driving circuit area GA is disposed between adjacent ones of the unit pixel areas UPA in the column direction, and gate driving circuits GC are disposed in each gate driving circuit area GA. Each of the gate driving circuits GC can be electrically connected to a plurality of gate driving circuits GC disposed in the row direction together therewith and, as such, can supply a gate signal to sub-pixels disposed in the same row. In this case, a gate driving line GCVL configured to transmit a signal for driving of the gate driving circuit GC can be disposed in the row direction. The gate driving line GCVL includes a high-level voltage line VGHL (FIG. 3) and a low-level voltage line VGLL (FIG. 3). The high-level voltage line VGHL and the lower-level voltage line VGLL can be disposed in the unit pixel areas UPA in the row direction.

As described above, the gate driver includes the scan driver and the emission driver and, as such, the gate driving circuit GC includes a scan driving circuit and an emission driving circuit. The gate driving circuit can also be referred to as a "scan driving circuit" or an "emission driving circuit". In addition, the gate driving line can also be referred to as a "scan driving line" or an "emission driving line". Meanwhile, the scan driving circuit and the emission driving circuit can be disposed in the same row, but can be disposed in different areas, respectively.

The data driver DD converts image data into a data signal, and supplies the converted data signal to the sub-pixels SP1, SP2, SP3, and SP4 through data lines DL, respectively. The data driver DD can be formed at a back surface of the substrate 110 or can be formed at a separate substrate. When the data driver DD is formed at one surface of a separate substrate, the substrate 110 and the separate substrate can be assembled to each other such that the other surface of the separate substrate, at which the data driver DD is not formed, faces the back surface of the substrate 110.

In order to electrically interconnect front and back surfaces of the substrate 110 or to electrically interconnect the front surface of the substrate 110 and the other surface of the separate substrate, a side line is disposed at a side surface of the substrate 110 or a side surface of the substrate separate from the substrate 110. Accordingly, the data driver DD disposed at the back surface of the substrate 110 or the other surface of the separate substrate can supply the data signal to the sub-pixels SP through the side line.

As described above, the gate driver GD in the display device 100 according to the aspect of the present disclosure can be disposed between adjacent sub-pixel units on the substrate 110. However, the present disclosure is not limited to the above-described condition, and the gate driver GD can be disposed at one side or opposite sides of the substrate 110.

Meanwhile, each gate line GL can be disposed on the substrate 110 in the row direction, and each data line DL can be disposed on the substrate 110 in the column direction. The gate line GL and the data line DL are disposed at all sub-pixels SP and, as such, supply signals to the sub-pixel circuits disposed at the sub-pixels SP.

Pad areas PA1 and PA2, in which pads are disposed, are formed at opposite sides of the substrate 110, for example, upper and lower portions of the substrate 110, in the row direction. In this case, the pad area formed at the upper portion of the substrate 110 is referred to as a "first pad area PA1", and the pad area formed at the lower portion of the substrate 110 is referred to as a "second pad area PA2". The first pad area PA1 and the second pad area PAD2 are facing areas in the substrate 110.

In the first pad area PA1, data pads DP connected to the data lines DL, gate pads GP connected to the gate driver GD, a high-level voltage pad VP1 connected to a high-level voltage line VL1, and a reference voltage pad connected to a reference voltage line VL3 can be disposed. In this case, the data pads DP can be disposed to correspond in number to the sub-pixels SP included in each sub-pixel unit. In addition, the high-level voltage line VL1 can be referred to as a "first power line", and the reference voltage line VL3 can be referred to as a "second power line".

In the gate driver GD, lines configured to supply various clock signals, a line configured to supply a gate-low drive voltage, a line configured to supply a gate-high voltage, etc. can be disposed and, as such, can transmit signals associated therewith. When there are gate drivers GD, the gate drivers GD are disposed in the column direction in parallel, and lines configured to transmit signals to each gate driver GD are aligned with the gate driver GD. The lines configured to transmit signals to the gate driver GD are referred to as "gate driving lines". The gate driving lines are disposed in the column direction and are connected to respective gate pads GP disposed in the first pad area PA1 and, as such, receive signals from the gate pads GP, respectively.

Referring to FIG. 2, the high-level voltage line VL1 can be disposed in the column direction between adjacent ones of the unit pixel areas UPA. The high-level voltage line VL1 disposed in the column direction supplies a high-level voltage to a plurality of sub-pixels SP through the high-level voltage pad VP1 disposed in the first pad area PA1. When a plurality of high-level voltage lines VL1 is disposed in the column direction, the plurality of high-level voltage lines VL1 is connected to auxiliary high-level voltage lines AVL1 disposed in the row direction and can form a mesh structure. The auxiliary high-level voltage lines AVL1 can be disposed between adjacent ones of the unit pixel areas UPA in all rows or a plurality of rows where sub-pixels are disposed, respectively. Each auxiliary high-level voltage line AVL1 can prevent voltage drop of corresponding ones of the high-level voltage lines VL1 and can supply a high-level voltage to a plurality of sub-pixels SP.

Referring to FIG. 3, high-level voltage lines VL11, VL12, VL13, and VL14 can be disposed in the column direction for respective sub-pixels SP1, SP2, SP3, and SP4 disposed in each unit pixel area UPA. The plural high-level voltage lines VL11, VL12, VL13, and VL14 disposed in each unit pixel area UPA are connected, through contact holes SCH1, to an auxiliary high-level voltage line SAVL1 disposed in the row direction in the unit pixel area UPA and, as such, can form a mesh structure.

The high-level voltage lines VL1, VL11, VL12, VL13, and VL14 and the auxiliary high-level voltage lines AVL1 and SAVL1, which are disposed inside and outside the unit pixel areas UPA, are electrically interconnected and, as such, form a mesh structure and receive a high-level voltage via the high-level voltage pad VP1.

In the second pad area PA2, high-level voltage pads VP2 connected to low-level voltage lines VL2, VL21, and VL22 can be disposed. The low-level voltage lines VL2, VL21, and VL22 can be disposed at opposite sides of each driving circuit area GA under the condition that the driving circuit area GA is interposed between adjacent ones thereof and can be disposed between adjacent ones of the sub-pixels and, as such, can supply a low-level voltage to the sub-pixels. Of course, the present disclosure is not limited to the above-described condition, and the low-level voltage lines VL2, VL21, and VL22 can be disposed at each sub-pixel. The low-level voltage lines VL2, VL21, and VL22 can be referred to as "second power lines".

The low-level voltage lines VL21 and VL22, which are disposed in plural in the column direction, are connected to an auxiliary low-level voltage line AVL2 disposed in the row direction. The auxiliary low-level voltage line AVL2 can be disposed in all rows or a plurality of rows where unit pixel areas UPA are disposed. The auxiliary low-level voltage line AVL2 can prevent voltage drop of the low-level voltage lines VL21 and VL22 and can supply a low-level voltage to a plurality of sub-pixels SP.

The reference voltage line VL3 can be disposed in the row direction for each of unit pixel areas UPA disposed in the row direction. The reference voltage line VL3 disposed in the row direction supplies a reference voltage to the sub-pixel unit corresponding thereto through a column-direction line which is separately disposed. The reference voltage line VL3 is connected to the reference voltage pad disposed in the first pad area PA1 and, as such, a reference voltage is supplied to a plurality of reference voltage lines VL3 through the reference voltage pad.

In order to reduce a bezel of the display panel PN included in the display device 100 according to the aspect of the present disclosure, an edge of the substrate 110 can be removed through grinding.

The bezel is an edge area of the substrate 110 where the sub-pixels SP1, SP2, SP3, and SP4 are not disposed. During grinding, portions of pads and lines disposed at the edge of the substrate 110 are removed and, as such, the size of the substrate 110 is reduced such that the display panel PN is implemented to have the same size as that of a final substrate 110F.

In detail, most of the pads disposed in the first pad area PA1 and the second pad area PA2 are removed from the final substrate 110F and, as such, only a part of the pads or a trace of the pads can remain.

Hereinafter, circuits of the plurality of sub-pixels SP1, SP2, SP3, and SP4 according to aspects of the present disclosure will now be described below.

Figure 4:
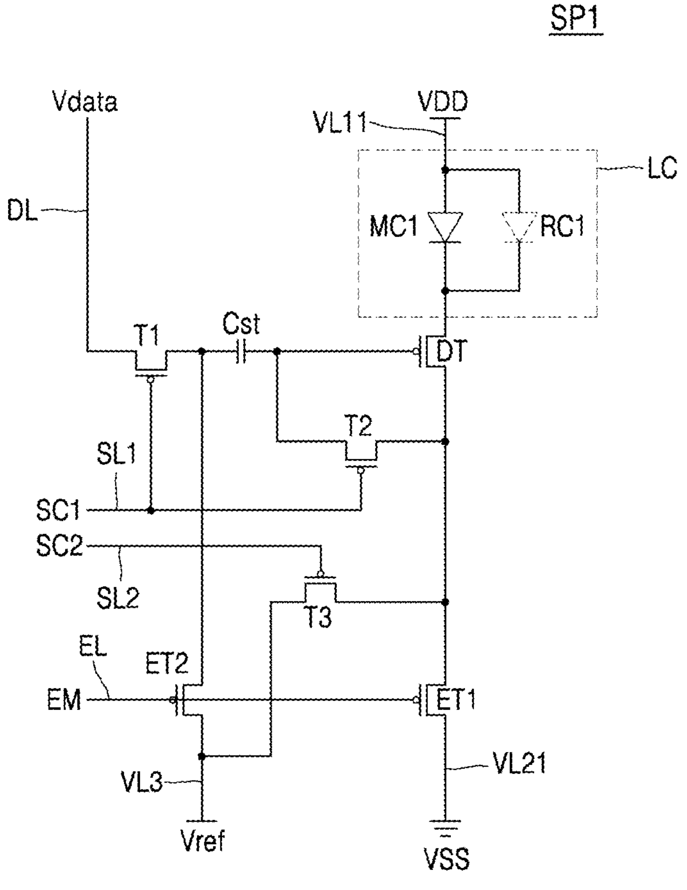
FIG. 4 is a circuit diagram of one sub-pixel included in the display device according to the aspect of the present disclosure.

FIG. 4 is a circuit diagram of one sub-pixel included in the display device according to the aspect of the present disclosure. Particularly, FIG. 4 is a circuit diagram of a sub-pixel circuit included in the first sub-pixel SP1. The same sub-pixel circuit of the first sub-pixel SP1 can be applied to and be present in each of the remaining sub-pixels SP2, SP3, and SP4.

Referring to FIG. 4, the first sub-pixel SP1 includes a light emitting element LC, and a sub-pixel circuit configured to supply a drive current to the light emitting element LC.

The light emitting element LC can include a first main light emitting element MC1 and a first auxiliary light emitting element RC1, without being limited thereto. For example, when it is assumed that the sub-pixel circuit included in the first sub-pixel PS1 is a first sub-pixel circuit, the sub-pixel circuit included in the second sub-pixel PS2 is a second sub-pixel circuit, the sub-pixel circuit included in the third sub-pixel PS3 is a third sub-pixel circuit, and the sub-pixel circuit included in the fourth sub-pixel PS4 is a fourth sub-pixel circuit, the first sub-pixel circuit can be connected to the first main light emitting element MC1, the second sub-pixel circuit can be connected to the first auxiliary light emitting element RC1, the third sub-pixel circuit can be connected to a second main light emitting element MC2 and a second auxiliary light emitting element RC2, and the fourth sub-pixel circuit can be connected to a third main light emitting element MC3 and a third auxiliary light emitting element RC3. When two light emitting elements are connected to one sub-pixel circuit, as in the above-described case, the two light emitting elements can be connected to each other in parallel.

Particularly, FIG. 4 illustrates the case in which the first main light emitting element MC1 and the first auxiliary light emitting element RC1 are disposed in parallel. An anode of the first main light emitting element MC1 and an anode of the first auxiliary light emitting element RC1 are connected to a high-level voltage line VL11 to which a high-level voltage VDD is supplied. In addition, a cathode of the first main light emitting element MC1 and a cathode of the first auxiliary light emitting element RC1 are connected to the sub-pixel circuit.

The sub-pixel circuit can include six transistors and one capacitor.

Each of the transistors can be a thin film transistor of an N-type or a P-type. In the present disclosure, description will be given in conjunction with, for example, the case in which each of the transistors is a P-type transistor. In addition, the transistors can be made of a semiconductor material such as oxide semiconductor, amorphous silicon, polysilicon, or the like, without being limited thereto.

A driving transistor DT includes a gate, a source, and a drain. In the driving transistor, the gate thereof is connected to one electrode of a capacitor Cst, the source thereof is connected to the cathodes of the first main light emitting element MC1 and the first auxiliary light emitting element RC1, and the drain thereof is connected to a source of a first emission transistor ET1. The driving transistor DT is controlled by a voltage applied to the gate thereof, thereby controlling a voltage of the cathodes. Accordingly, the first main light emitting element MC1 and the first auxiliary light emitting element RC1 can emit light.

A first transistor T1 includes a gate, a source, and a drain. In the first transistor T1, the gate thereof is connected to a first scan line SL1, the source thereof is connected to a data line DL, and the drain thereof is connected to the other electrode of the capacitor Cst. The first transistor T1 is controlled by a first scan signal SC1, thereby supplying a data voltage Vdata to the other electrode of the capacitor Cst.

A second transistor T2 includes a gate, a source, and a drain. In the second transistor T2, the gate thereof is connected to the first scan line SL1, the source thereof is connected to the other electrode of the capacitor Cst, and the drain thereof is connected to the drain of the driving transistor DT. The second transistor T2 is controlled by the first scan signal SC1, thereby causing the gate and the drain of the driving transistor DT to be conducted, and, as such, a diode connection of the driving transistor DT can be established. Accordingly, the second transistor T2 can sample a threshold voltage of the driving transistor DT.

A third transistor T3 includes a gate, a source, and a drain. In the third transistor T3, the gate thereof is connected to a second scan line SL2, the source thereof is connected to the drain of the driving transistor DT, and the drain thereof is connected to a reference voltage line VL3. The third transistor T3 is controlled by a second scan signal SC2, thereby supplying a reference voltage Vref to the drain of the driving transistor DT.

A first light emitting transistor ET1 includes a gate, a source, and a drain. In the first light emitting transistor ET1, the gate thereof is connected to an emission line EL, the source thereof is connected to the drain of the driving transistor DT, and the drain thereof is connected to a low-level voltage line VL21. The first light emitting transistor ET1 is controlled by an emission signal EM, thereby supplying a low-level voltage VSS to the drain of the driving transistor DT.

A second light emitting transistor ET2 includes a gate, a source, and a drain. In the second light emitting transistor ET2, the gate thereof is connected to the emission line EL, the source thereof is connected to the other electrode of the capacitor Cst and the drain of the first transistor T1, and the drain thereof is connected to the reference voltage line VL3. The second light emitting transistor ET2 is controlled by the emission signal EM, thereby supplying the reference voltage Vref to the other electrode of the capacitor Cst and the drain of the first transistor T1.

The sources and drains of the above-described transistors can be interchanged in terms of constituent element names in accordance with kinds of the transistors or voltages applied to the transistors.

Figure 5:
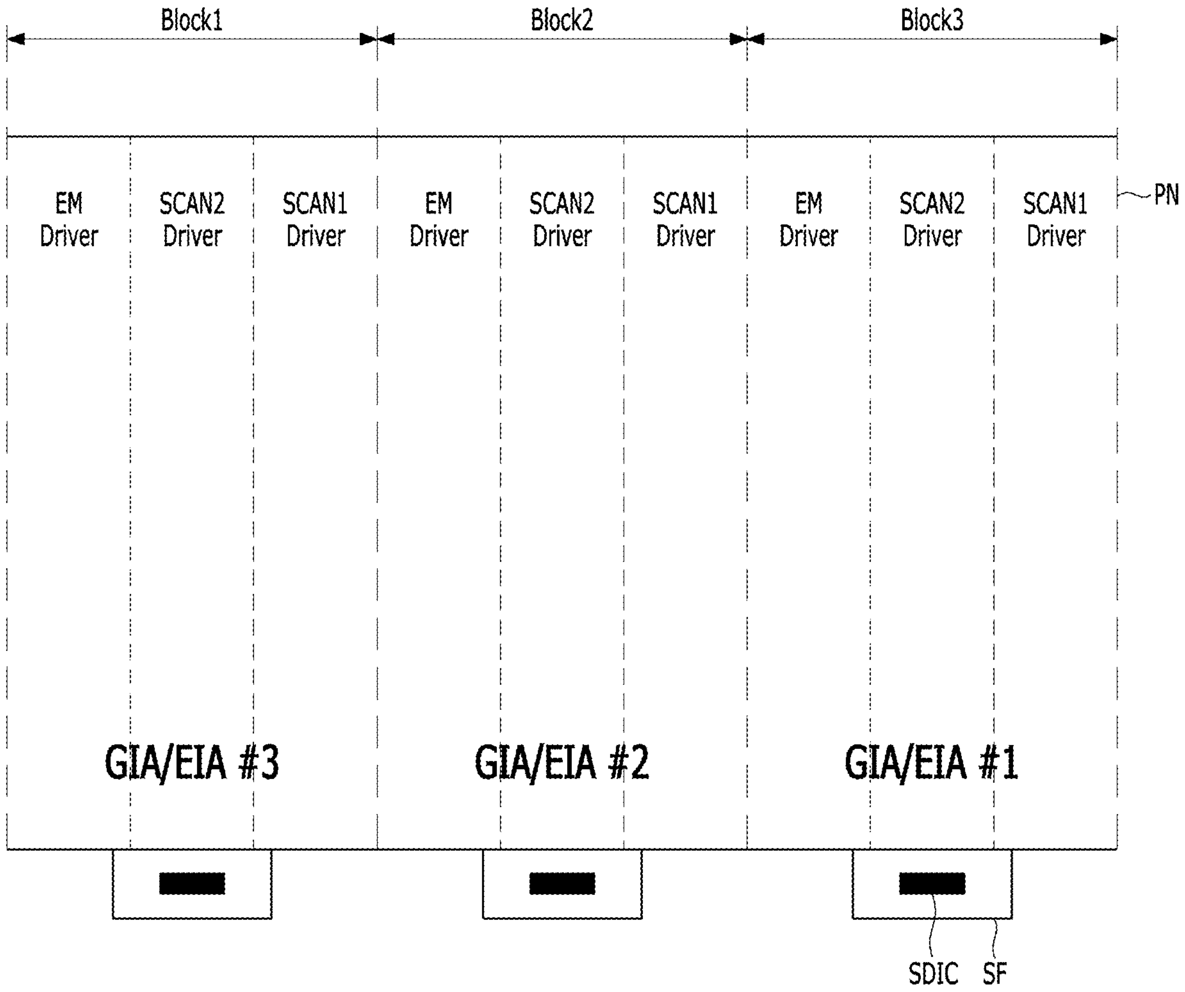
FIG. 5 is a diagram illustrating an arrangement method of a gate driver of the display device according to the aspect of the present disclosure.

FIG. 5 is a diagram illustrating an arrangement method of the gate driver of the display device according to the aspect of the present disclosure. Specifically, FIG. 5 is a diagram illustrating a configuration of the gate driver configured to supply drive signals to the sub-pixel circuit of FIG. 4. As described above, the sub-pixel circuit of FIG. 4 can be driven in accordance with the first scan signal SC1, the second scan signal SL2, and the emission signal EM input thereto. Accordingly, the gate driver can include a first scan driver SCAN1 Driver, a second scan driver SCAN2 Driver, and an emission driver EM Driver.

Referring to FIG. 5, the display panel PN can be driven under the condition that the entire area thereof is divided into three blocks Block1, Block2, and Block3. In this case, gate drivers GIA/EIA#1, GIA/EIA#2 and GIA/EIA#3, each of which includes a first scan driver SCAN1 Driver, a second scan driver SCAN2 Driver, and an emission driver EM Driver, can be disposed in pixel areas of respective blocks Block1, Block2, and Block3. For example, in the display device 100 according to the aspect of the present disclosure, the gate driver GD can include scan drivers and emission drivers in a gate driver-in-array (GIA) manner in which scan drivers are disposed among pixel areas or in an emission driver-in-array (EIA) manner in which emission drivers are disposed among pixel areas.

Data drivers SDIC each configured to supply a data signal to each sub-pixel can be connected to the blocks Block1, Block2, and Block3, respectively. The numbers and the arrangement method of the gate drivers GIA/EIA#1, GIA/EIA#2 and GIA/EIA#3 and the data drivers SDIC included in the display panel PN as described above are only illustrative, and can be diversely varied for application thereof.

Figure 6:
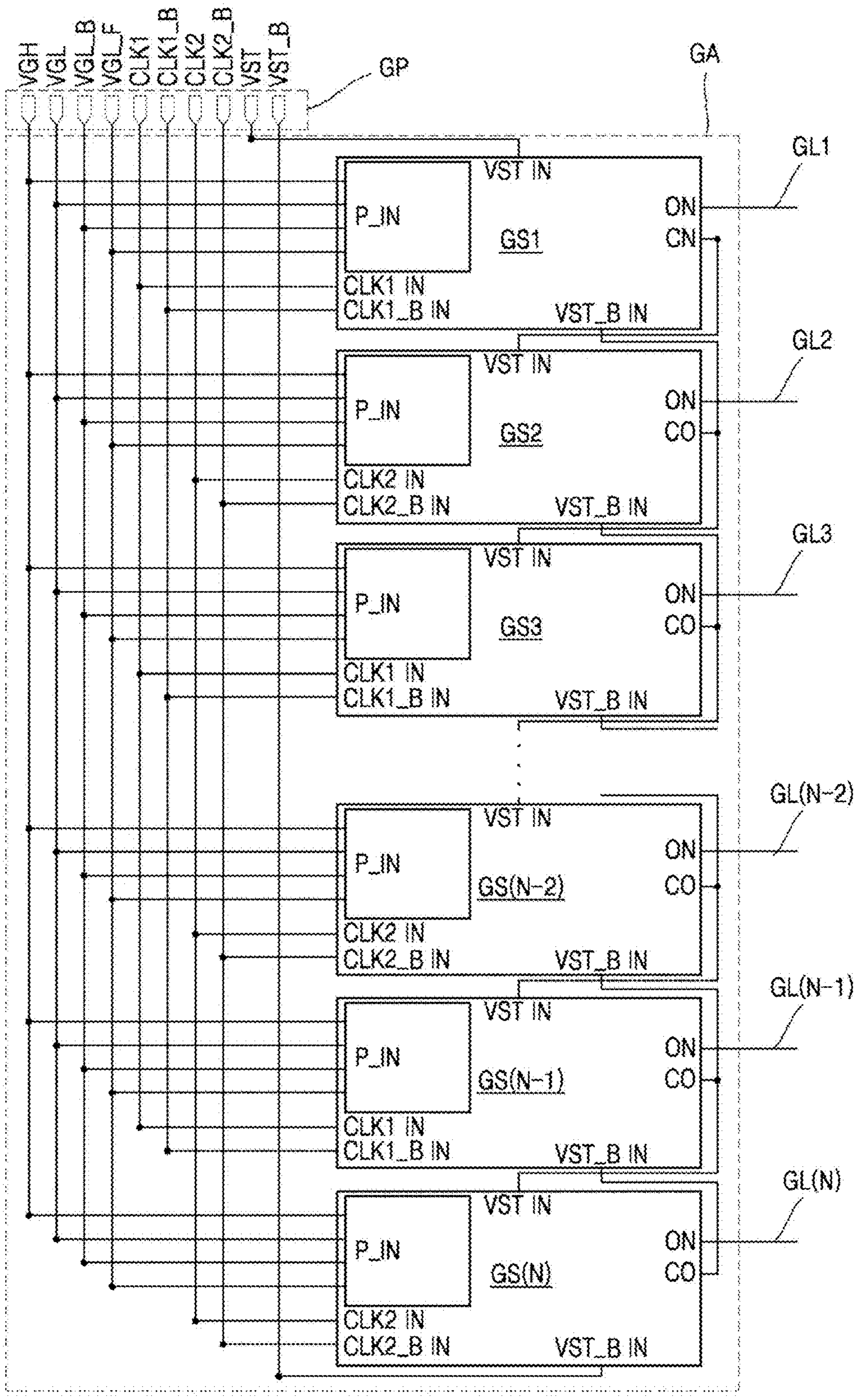
FIG. 6 is a diagram illustrating a configuration of the gate driver included in the display device according to the aspect of the present disclosure.

FIG. 6 is a diagram illustrating a configuration of the gate driver included in the display device according to the aspect of the present disclosure.

Referring to FIG. 6, the gate driver includes a plurality of stages GS1, GS2, GS3, . . . , GS(N−2), GS(N−1), and GS(N). The plurality of stages is N in number, and N is a natural number. In addition, the gate driver shown in FIG. 6 can represent an emission driver.

A plurality of clock signal lines, a plurality of voltage lines, and a plurality of signal lines configured to drive the plurality of stages GS1, GS2, GS3, . . . , GS(N−2), GS(N−1), and GS(N) are disposed in a gate driving circuit area GA.

The plurality of clock signal lines can include a first clock signal line configured to supply a first clock signal CLK1, a first backward clock signal line configured to supply a first backward clock signal CLK1_B, a second clock signal line configured to supply a second clock signal CLK2, and a second backward clock signal line configured to supply a second backward clock signal CLK2_B.

The plurality of voltage lines can include a high-level voltage line configured to supply a high-level voltage VGH, a low-level drive voltage line configured to supply a low-level drive voltage VGL, a forward low-level drive voltage line configured to supply a forward low-level drive voltage VGL F, and a backward low-level drive voltage line configured to supply a backward low-level drive voltage VGL B.

The plurality of signal lines can include a start signal line configured to supply a start signal VST, a backward start signal line configured to supply a backward start signal VST_B, and a reset signal line configured to supply a reset signal.

The plurality of stages GS1, GS2, GS3, . . . , GS(N−2), GS(N−1), and GS(N), the plurality of clock signal lines, and the plurality of voltage lines are disposed in the gate driving circuit area GA. Gate pads GP configured to supply signals to ends of the plurality of clock signal lines and the plurality of voltage lines can also be disposed.

Each of the plurality of stages GS1, GS2, GS3, . . . , GS(N−2), GS(N−1), and GS(N) includes a low power input P_IN and clock signal inputs CLK1_IN, CLK1_B IN, CLK2_IN, and CLK2_B IN. The low power input P_IN includes a plurality of nodes, and receives voltages supplied from the plurality of voltage lines.

For example, when N is an even number, odd ones of the plurality of stages GS1, GS2, GS3, . . . , GS(N−2), GS(N−1), and GS(N), for example, the odd stages GS1, GS3, . . . , and GS(N−1), can be connected to the first clock signal line configured to supply the first clock signal CLK1 and the first backward clock signal line configured to supply the first backward clock signal CLK1_B, and the even stages GS2, . . . , GS(N−2), and GS(N) can be connected to the second clock signal line configured to supply the second clock signal CLK2 and the second backward clock signal line configured to supply the second backward clock signal CLK2_B.

Each of the plurality of stages GS1, GS2, GS3, . . . , GS(N−2), GS(N−1), and GS(N) includes a start signal node VST IN, to which the start signal VST is supplied, and a backward start signal node VST_B IN, to which the backward start signal VST_B is supplied. In this case, the start signal node VST IN of the first stage GS1 is connected to the start signal line configured to supply the start signal VST, and the backward start signal node VST_B IN of the N-th stage GS(N) is connected to the backward start signal line configured to supply the backward start signal VST_B.

The start signal node VST IN of each of the second stage GS2 to the N−1-th stage GS(N−1) is connected to the carry node CN of an upstream stage and receives a carry signal from the carry node CN. In addition, the backward start signal node VST_B IN of each of the second stage GS2 to the N−1-th stage GS(N−1) is connected to the carry node CN of a downstream stage and receives a carry signal from the carry node CN of the downstream stage.

The output node ON included in each of the plurality of stages GS1, GS2, GS3, . . . , GS(N−2), GS(N−1), and GS(N) is connected to a gate line and, as such, outputs a gate signal. The first stage GS1 is connected to a first gate line GL1, the second stage GS2 to a second gate line GL2, the third stage GS3 to a third gate line GL3, . . . , the N−2-th stage GS(N−2) to an N−2-th gate line GL (N−2), the N−1-th stage GS(N−1) to an N−1-th gate line GL (N−1), and the N-th stage GS(N) to an N-th gate line GL (N). In this case, the gate line can be an emission line.

The gate driver according to the aspect of the present disclosure can output a gate signal through sequential driving thereof from the first stage GS1 to the N-the stage GS(N) by the start signal VST and can output a gate signal through sequential driving thereof from the N-the stage GS(N) to the first stage GS1 in a backward direction by the backward start signal VST_B. Accordingly, the gate driver according to the aspect of the present disclosure can perform bidirectional driving using one gate driver and, as such, can reduce costs.

Figure 7:
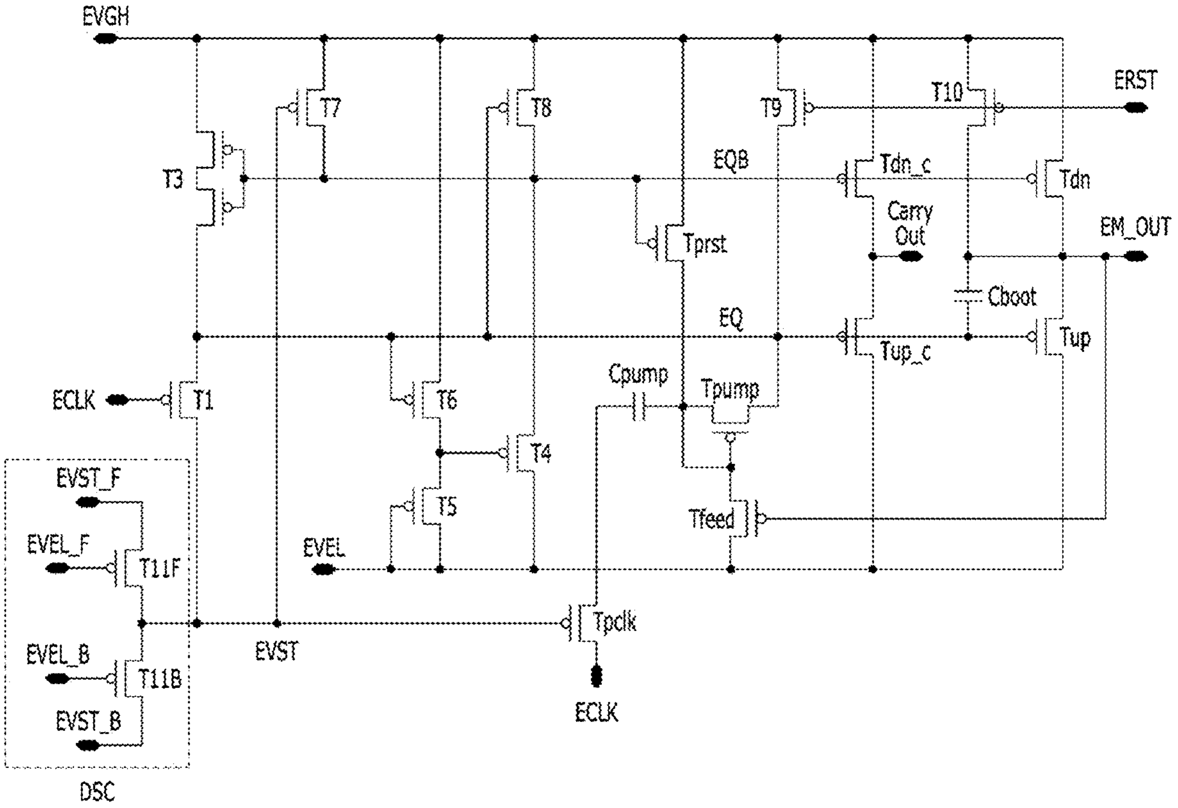
FIG. 7 is a circuit diagram illustrating an emission driving circuit included in a gate driver according to a first aspect of the present disclosure.
Figure 8:
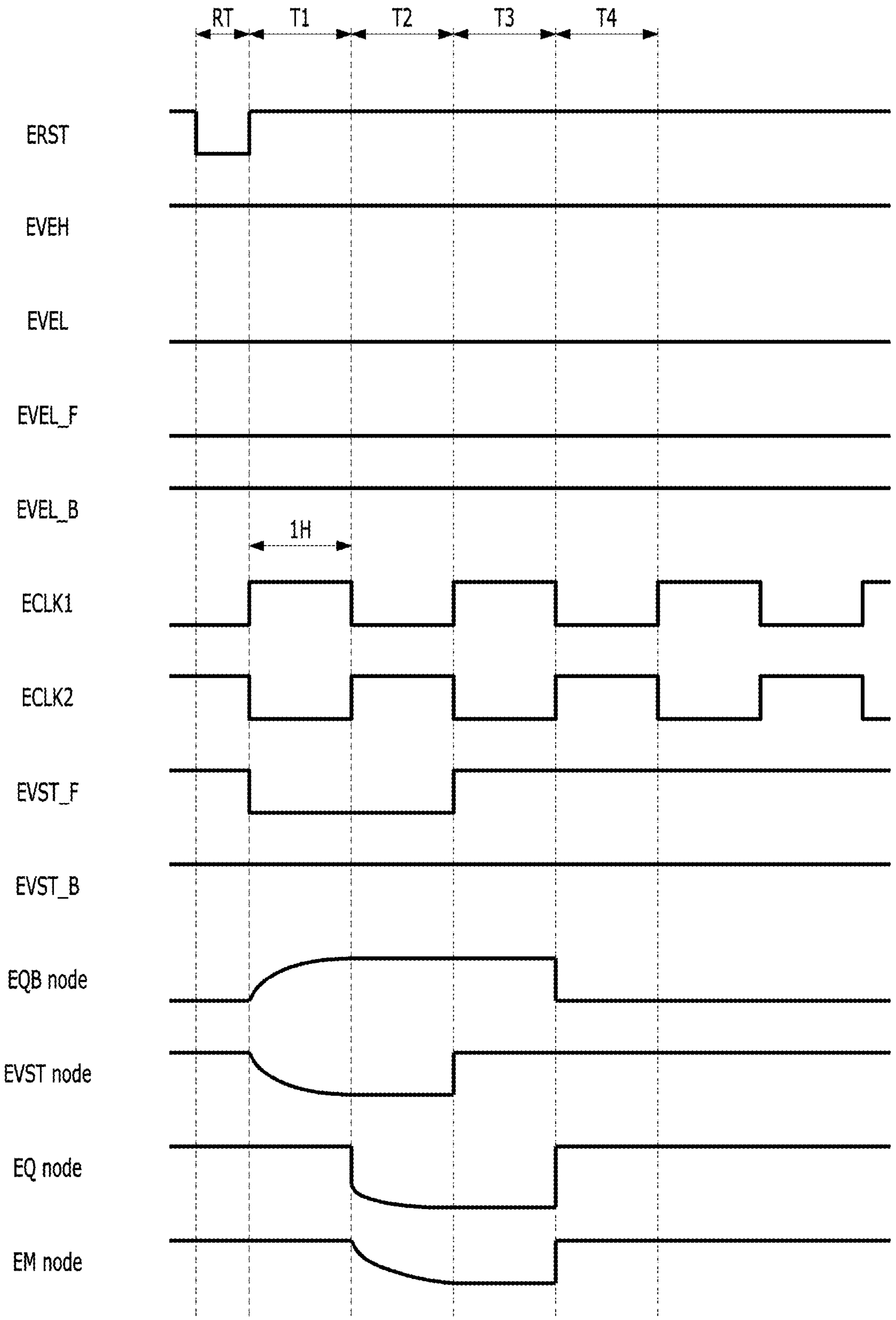
FIG. 8 is a diagram illustrating driving timings of the emission driving circuit of FIG. 7.

FIGS. 7 and 8 are circuit diagrams for explaining a gate driving circuit according to an aspect of the present disclosure. The following description will be given in conjunction with an example in which a gate driver is an emission driver.

Particularly, FIG. 7 is a circuit diagram illustrating an emission driving circuit included in a gate driver according to a first aspect of the present disclosure. FIG. 8 is a diagram illustrating driving timings of the emission driving circuit of FIG. 7.

The emission driving circuit can be disposed in a plurality of gate driving circuit areas GA in a divided manner. In detail, the emission driving circuit can be disposed in a divided manner in a plurality of gate driving circuit areas GA disposed in rows in which emission lines EL configured to receive an emission signal EM are disposed. In addition, the emission driving circuit can be included in one of the plurality of stages GS1, GS2, GS3, . . . , GS(N−2), GS(N−1), and GS(N) of FIG. 6.

Transistors included in the emission driving circuit are transistors each including a gate, a first source/drain, and a second source/drain. The following description will be given in conjunction with an example in which each of the transistors is a P-type transistor. The P-type transistor is turned on when a low drive voltage is applied to a gate thereof, and is turned off when a high drive voltage is applied to the gate thereof.

Referring to FIGS. 7 and 8, the emission driving circuit can be driven by a high drive voltage EVGH, a low drive voltage EVEL, a forward low voltage EVEL_F, a backward low voltage EVEL_B, a forward start signal EVST_F, a backward start signal EVST_B, a clock signal ECLK, and an emission control reset signal ERST, thereby outputting a carry signal Carry and an emission signal EM.

The emission driving circuit can include a pull-up transistor Tup, a pull-down transistor Tdn, a plurality of transistors T1, T3, T4, T5, T6, T7, T8, T9, T10, Tup_c, Tdn_c, Tpump, Tfeed, Tpclk, and Tprst for generation of an emission signal, at least one capacitor, for example, capacitors Cpump and Cboot, and a direction selection circuit DSC for selection of forward driving or backward driving.

The pull-up transistor Tup can be electrically connected between an input terminal for the low drive voltage EVEL and an output terminal for the emission signal EM. The pull-up transistor Tup can be controlled by a voltage level of a Q-node EQ. The low drive voltage EVEL can be, for example, a low-level drive voltage. The pull-up transistor Tup can control output of an emission signal EM having a turn-on level to a gate line GL.

The pull-down transistor Tdn can be electrically connected between an input terminal for the high drive voltage EVGH and the output terminal for the emission signal EM. The pull-down transistor Tdn can be controlled by a voltage level of a QB-node EQB. The high drive voltage EVGH can be, for example, a high-level drive voltage. The pull-down transistor Tdn can control output of an emission signal EM having a turn-off level to the gate line GL.

The first transistor T1 can be electrically connected between a start signal input node EVST and the Q-node EQ. The first transistor T1 can operate in accordance with a voltage level of the clock signal ECLK. The first transistor T1 is turned on when the clock signal ECLK has a low level, for example, a turn-on level, thereby interconnecting the start signal input node EVST and the Q-node EQ.

The third transistor T3 can be electrically connected between the input terminal for the high drive voltage EVGH and the Q-node EQ. The third transistor T3 can operate in accordance with a voltage level of the QB-node EQB.

The fourth transistor T4 can be electrically connected between the input terminal for the low drive voltage EVEL and the QB-node EQB. The fourth transistor T4 can operate in accordance with a voltage level of a node between the fifth transistor T5 and the sixth transistor T6.

The fifth transistor T5 and the sixth transistor T6 can be electrically connected between the input terminal for the low drive voltage EVEL and the input terminal for the high drive voltage EVGH. The fifth transistor T5 can operate in accordance with a voltage level of the low drive voltage EVEL. The sixth transistor T6 can operate in accordance with a voltage level of the Q-node EQ.

In accordance with operations of the fourth, fifth, and sixth transistors T4, T5, and T6 as described above, the QB-node EQB can maintain a high voltage when the Q-node EQ has a low voltage, whereas a low voltage can be applied to the QB-node EQB when the Q-Node EQ has a high voltage. When the Q-node EQ has a low voltage, the sixth transistor T6 is turned on, thereby applying the high drive voltage EVGH to a gate of the fourth transistor T4. As a result, the fourth transistor T4 is turned off and, as such, the QB-node EQB maintains the high drive voltage EVGH. When the Q-node EQ has a high voltage, the sixth transistor T6 is turned off. Accordingly, the fourth transistor T4 is turned on by the turned-on fifth transistor T5. The turned-on fourth transistor T4 supplies the low drive voltage EVEL to the QB-node EQB.

The seventh transistor T7 and the eighth transistor T8 can be electrically connected between the input terminal for the high drive voltage EVGH and the QB-node EQB. The seventh transistor T7 can operate in accordance with a signal supplied to the start signal input node EVST. The eighth transistor T8 can operate in accordance with a voltage level of the Q-node EQ. When the Q-node EQ has a low voltage, the eighth transistor T8 can supply the high drive voltage EVGH to the QB-node EQB and can maintain the QB-node EQB at the high drive voltage EVGH.

The ninth transistor T9 can be electrically connected between the input terminal for the high drive voltage EVGH and the Q-node EQ. The tenth transistor T10 can be electrically connected between the input terminal for the high drive voltage EVGH and the output terminal for the emission signal EM. The ninth transistor T9 and the tenth transistor T10 can operate in accordance with the emission control reset signal ERST.

The pull-up transistor Tup_c and the pull-down transistor Tdn_c for output of the carry signal Carry can be disposed separately from the pull-up transistor Tup and the pull-down transistor Tdn for output of the emission signal EM. The pull-up transistor Tup_c and the pull-down transistor Tdn_c for output of the carry signal Carry can operate simultaneously with the pull-up transistor Tup or the pull-down transistor Tdn for output of the emission signal EM, thereby outputting the carry signal Carry.

The boot capacitor Cboot can be electrically connected between the Q-node EQ and the output terminal for the emission signal EM. The Q-node EQ can be coupled to the output terminal for the emission signal EM by the boot capacitor Cboot. The boot capacitor Cboot can lower the voltage level of the Q-node EQ at a time when the voltage level of the output terminal for the emission signal EM is lowered and the emission signal EM having the turn-on level is output.

The pump capacitor Cpump can be electrically connected between the Q-node EQ and an input terminal for the clock signal ECLK. The pump capacitor Cpump can maintain the Q-node EQ at a sufficiently low voltage level in a period in which the emission signal EM of the turn-on level is maintained.

The pump transistor Tpump can be electrically connected between the pump capacitor Cpump and the Q-node EQ. A gate node of the pump transistor Tpump can be electrically connected to a node between the feed transistor Tfeed and the pump capacitor Cpump. The pump transistor Tpump can operate in accordance with a signal supplied thereto through the feed transistor Tfeed.

The feed transistor Tfeed can be electrically connected between the gate node of the pump transistor Tpump and the input terminal for the low drive voltage EVEL. The feed transistor Tfeed can operate in accordance with a voltage level of the emission signal EM.

The clock transistor Tpclk can be electrically connected between the pump capacitor Cpump and the input terminal for the clock signal ECLK. The clock transistor Tpclk can operate in accordance with a voltage level of the start signal input node EVST to which the forward or backward start signal EVST_F or EVST_B is input.

The reset transistor Tprst can be electrically connected between the input terminal for the high drive voltage EVGH and the pump capacitor Tpump. The reset transistor Tprst can be electrically connected to the gate node of the pump transistor Tpump. The reset transistor Tprst can operate in accordance with a voltage level of the QB-node EQB.

When an emission control reset signal ERST having a turn-on level is supplied, the ninth transistor T9 and the tenth transistor T10 are turned on and, as such, the high drive voltage EVGH can be supplied to the Q-node EQ and the output terminal for the emission signal EM. As a result, the Q-node EQ is maintained at a high level, and the QB-node EQB is maintained at a low level, and, as such, an emission signal EM having a turn-off level can be output.

The direction selection circuit DSC applies, to the start signal input node EVST, the forward start signal EVST_F for enabling the emission driving circuit to perform forward driving or the backward start signal EVST_B for enabling the emission driving circuit to perform backward driving.

The direction selection circuit DSC includes a forward direction selection transistor T11F and a backward direction selection transistor T11B.

The forward direction selection transistor T11F is a transistor for forward driving and is connected to the forward low voltage EVEL_F at a gate thereof while being connected to a line for the forward start signal EVST_F at a first source/drain thereof and connected to the start signal input node EVST at a second source/drain thereof. Accordingly, when the forward low voltage EVEL_F is input, the forward direction selection transistor T11F applies the forward start signal EVST_F to the start signal input node EVST.

The backward direction selection transistor T11B is a transistor for backward driving and is connected to the backward low voltage EVEL_B at a gate thereof while being connected to a line for the backward start signal EVST_B at a first source/drain thereof and connected to the start signal input node EVST at a second source/drain thereof. Accordingly, when the backward low voltage EVEL_B is input, the backward direction selection transistor T11B applies the backward start signal EVST_B to the start signal input node EVST.

As shown in the waveform diagram of FIG. 8, in forward driving, the forward low voltage EVEL_F is maintained at a low level, and the backward low voltage EVEL_B is maintained at a high level. Accordingly, during forward driving, the forward direction selection transistor T11F is always maintained in a turn-on state, and the backward direction selection transistor T11B is maintained in a turn-off state. Conversely, in backward driving, the forward low voltage EVEL_F is maintained at a high level, and the backward low voltage EVEL_B is maintained at a low level. Accordingly, during backward driving, the forward direction selection transistor T11F is always maintained in a turn-off state, and the backward direction selection transistor T11B is maintained in a turn-on state.

In forward driving of the emission driving circuit, the forward direction selection transistor T11F is turned on by the forward low voltage EVEL_F, thereby applying the forward start signal EVST_F to the start signal input node EVST. The forward direction selection transistor T11F can output the emission signal EM by supplying a low voltage of the forward start signal EVST_F to the Q-node EQ.

In backward driving of the emission driving circuit, the backward direction selection transistor T11B is turned on by the backward low voltage EVEL_B, thereby applying the backward start signal EVST_B to the start signal input node EVST. The backward direction selection transistor T11B can output the emission signal EM by supplying a low voltage of the backward start signal EVST_F to the Q-node EQ.

FIG. 8 is a diagram illustrating driving timings of the emission driving circuit of FIG. 7, and illustrates driving waveforms in forward driving.

Referring to FIG. 8, the emission control reset signal ERST can be output in order to reset operation of the emission driving circuit before a frame starts. When the emission control reset signal ERST is applied at a low level, the ninth transistor T9 and the tenth transistor T10 are turned on. The turned-on ninth transistor T9 can apply the high drive voltage EVGH to the Q-node EQ. The turned-on tenth transistor T10 can apply the high drive voltage EVGH to the output terminal for the emission signal EM. Accordingly, the Q-node EQ and the output terminal of the emission signal EM can be discharged at the high drive voltage EVGH.

The high drive voltage EVGH and the low drive voltage EVEL are fixedly supplied to the emission driving circuit. The high drive voltage EVGH and the low drive voltage EVEL are maintained at constant voltage levels, respectively, irrespective of forward driving and backward driving.

The forward low voltage EVEL_F and the backward low voltage EVEL_B are applied in accordance with different driving directions of the emission driving circuit, respectively. In forward driving, the forward low voltage EVEL_F is applied at a low-level voltage, and the backward low voltage EVEL_B is maintained at a high level. Since FIG. 8 illustrates driving waveforms in forward driving, the forward low voltage EVEL_F is shown as being applied as a low-level voltage, and the backward low voltage EVEL_B is shown as being applied at a high level. On the other hand, in backward driving, the backward low voltage EVEL_B is applied as a low-level voltage, and the forward low voltage EVEL_F is maintained at a high level.

Clock signals ECLK1 and ECLK2 can be signals applied in the form of pulses having predetermined cycles, predetermined signal magnitudes, and predetermined duty ratios. Each of the clock signals ECLK1 and ECLK2 can have a first level (for example, a low level) and a second level (for example, a high level). Each of the clock signals ECLK1 and ECLK2 can be a signal alternating between the first level and the second level, and a sum of a period in which the first level is maintained and a period in which the second level is maintained can be referred to as "one cycle". The first clock signal ECLK1 and the second clock signal ECLK2 can be input to odd stages and even stages, respectively. The number of clock signals can be varied in accordance with a driving method of the emission control driver.

Each of the forward start signal EVST_F and the backward start signal EVST_B is a pulse signal having a predetermined cycle and a predetermined magnitude. With reference to one cycle (1H) in which the clock signals ECLK1 and ECLK2 maintain a constant value, the forward start signal EVST_F or the backward start signal EVST_B can be supplied for a period of two cycles (2H). In forward driving, the forward start signal EVST_F is applied at a low-level voltage, and the backward start signal EVST_B is maintained at a high level. Since FIG. 8 illustrates driving waveforms in forward driving, the forward start signal EVST_F is shown as being applied in the form of a low-level pulse, and the backward start signal EVST_B is shown as being maintained at a high level. On the other hand, in backward driving, the backward start signal EVST_B can be applied in the form of a low-level pulse, and the forward start signal EVST_F can be maintained at a high level.

Next, voltage variations of the QB-node EQB, the start signal input node EVST, the Q-node EQ, and an output terminal for the emission signal EM, for example, an EM-node, which are included in the emission driving circuit, will be described. When the forward start signal EVST_F is input at a low level, the start signal input node EVST is begun to be charged at a low level. At the same time, the QB-node EQB is begun to be discharged at a high level.

For a period of 2H in which the forward start signal EVST_F is input at a low level, the start signal input node EVST is also charged at a low level. When the forward start signal EVST_F transitions to a high level, the start signal input node EVST is also discharged at a high level.

Simultaneously with charging of the start signal input node EVST at a low level, the QB-node EQB is begun to be discharged at a high level. After being discharged at a high level, the start signal input node EVST is maintained in the state of having been discharged at a high level for a period of 1H.

The Q-node EQ and the output terminal for the emission signal EM, for example, the EM-node, are begun to be charged at a low level in a period next to a period of 1H in which the start signal input node EVST is charged at a low level, and can be maintained in a state of having been charged at a low level for a period of 2H until the start signal input node EVST is discharged at a high level for a period of 1H.

A driving method of the emission driving circuit according to the first aspect of the present disclosure having the above-described configuration will be described with reference to FIGS. 9A to 14. FIGS. 9A to 14 illustrate a driving method of the emission driving circuit in forward driving. In accordance with the driving method, the forward low voltage EVEL_F is fixedly supplied at a low level, and the backward low voltage EVEL_B is fixedly supplied at a high level. In the following description, a turn-on level can mean a low level, and a turn-off level can mean a high level.

Figure 9A:
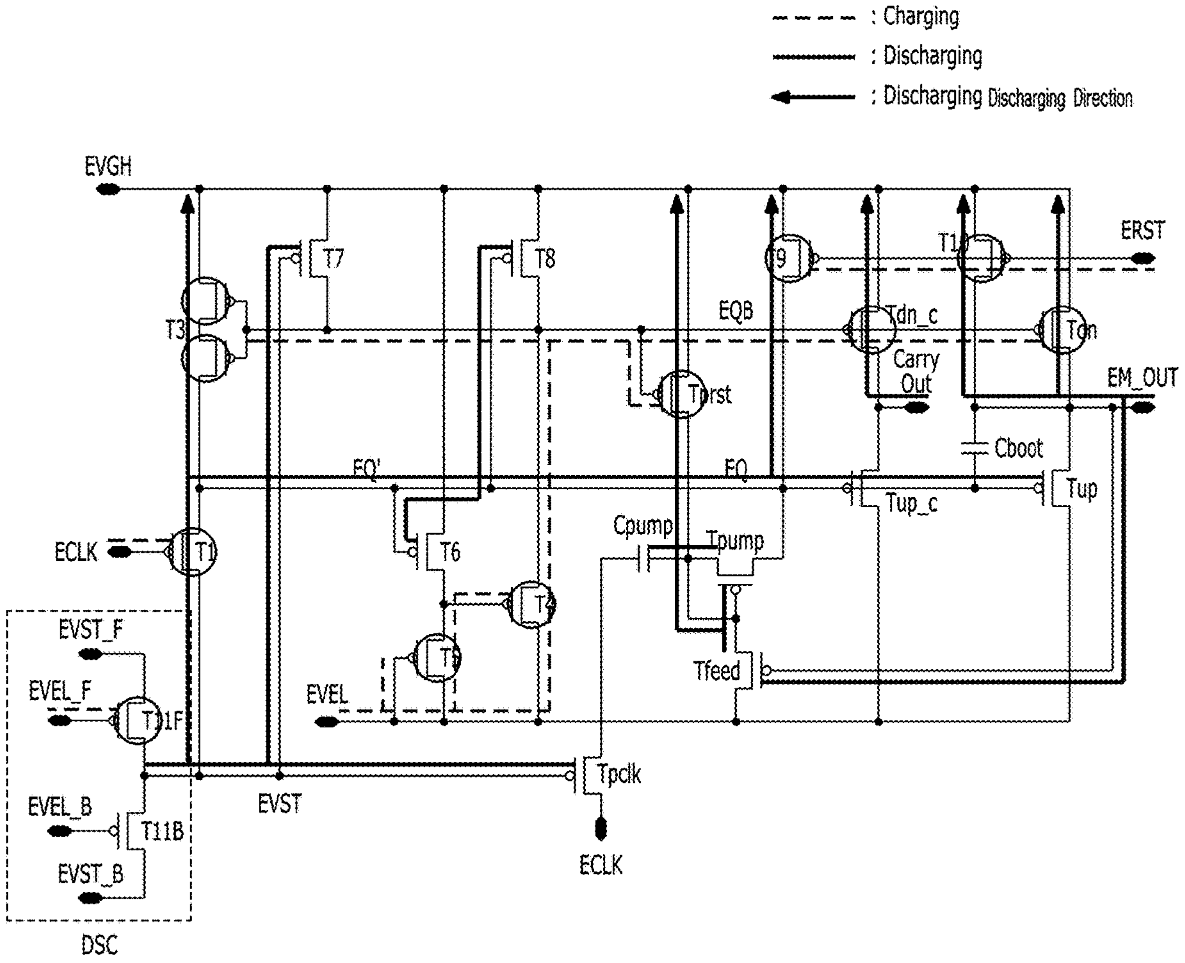
FIGS. 9A to 14 are diagrams explaining a driving method of the emission driving circuit included in the gate driver according to the first aspect of the present disclosure.
Figure 9B:
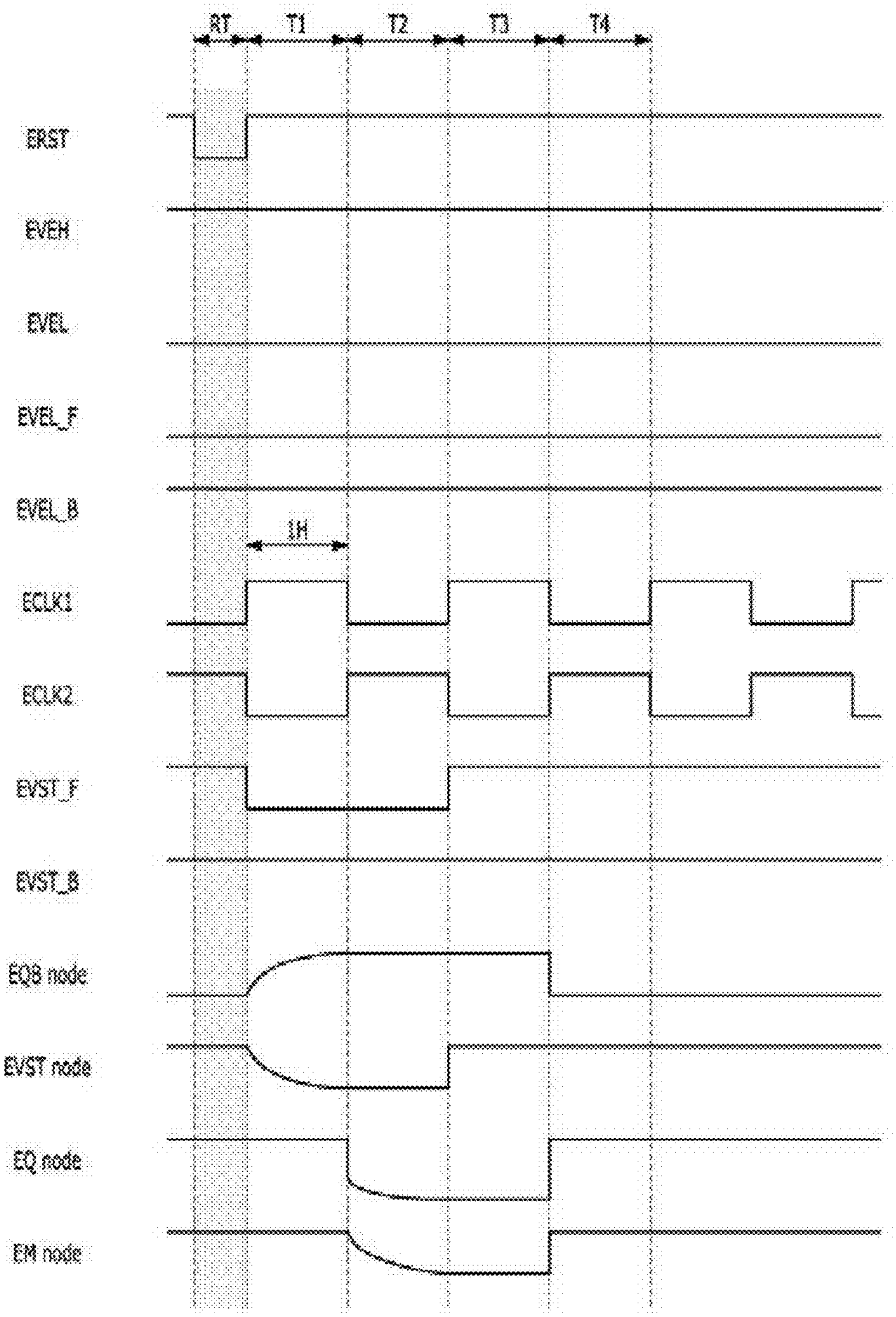

FIGS. 9A and 9B show a driving method and driving waveforms of the emission driving circuit in a reset period RT.

Referring to FIGS. 9A and 9B, the reset period RT can be performed in order to discharge the Q-node EQ and the EM-node at a high level before a frame starts. When an emission control reset signal ERST of a turn-on level is supplied in the reset period RT, the ninth transistor T9 and the tenth transistor T10 are turned on and, as such, the high drive voltage EVGH can be supplied to the Q-node EQ and the output terminal for the emission signal EM. The Q-node EQ can be maintained at a high level, the QB-node EQB can be maintained at a low level, and an emission signal EM of a turn-off level can be output.

FIGS. 10A to 14 illustrate the case in which the emission driving circuit performs forward driving for a period of one frame. In forward driving, the forward low voltage EVEL_F is maintained at a low level, and the backward low voltage EVEL_B is maintained at a high level. Accordingly, during forward driving, the forward direction selection transistor T11F can be always maintained in a turn-on state, and the backward direction selection transistor T11B can be maintained in a turn-off state.

Figure 10A:
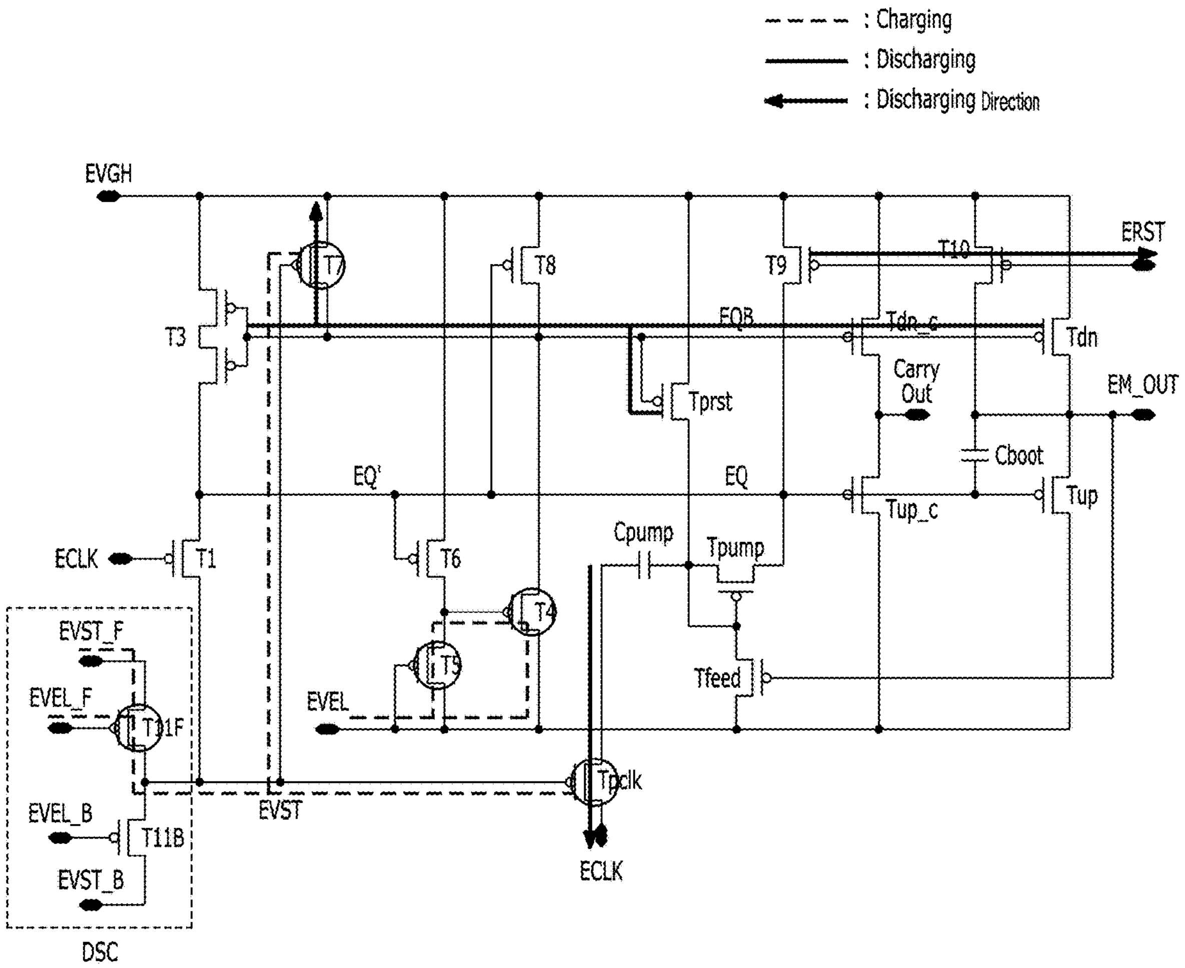
Figure 10B:
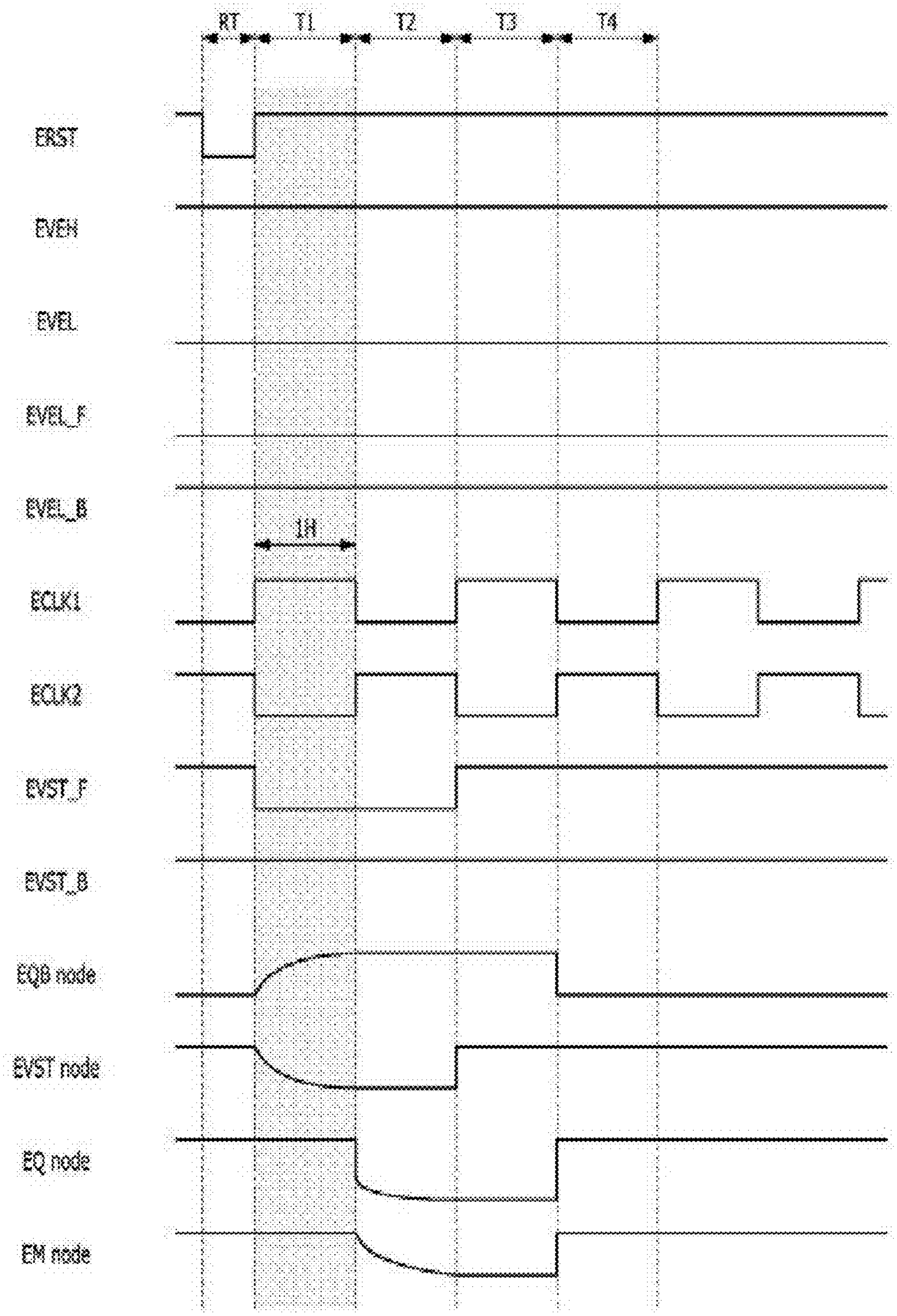

Particularly, FIGS. 10A and 10B show a driving method and driving waveforms of the emission driving circuit in a first period T1.

Referring to FIGS. 10A and 10B, in the first period T1, the forward start signal EVST_F is applied at a low level, for example, a turn-on level. Since the forward direction selection transistor T11F is in a turn-on state by the forward low voltage EVEL_F, the forward direction selection transistor T11F applies the forward start signal EVST_F to the start signal input node EVST.

When the forward start signal EVST_F of the turn-on level is applied to the start signal input node EVST, the start signal input node EVST can be charged at a low level.

When the start signal input node EVST is charged at a low level, the seventh transistor T7 is turned on, thereby applying the high drive voltage EVGH to the QB-node EQB. Accordingly, the QB-node EQB can be discharged at a high level.

When the start signal input node EVST is charged at a low level, the clock transistor Tpclk is turned on. Since the clock signal ECLK is applied at a high level in this case, the node, to which the clock transistor Tpclk is connected, can be discharged at a high level.

Figure 11A:
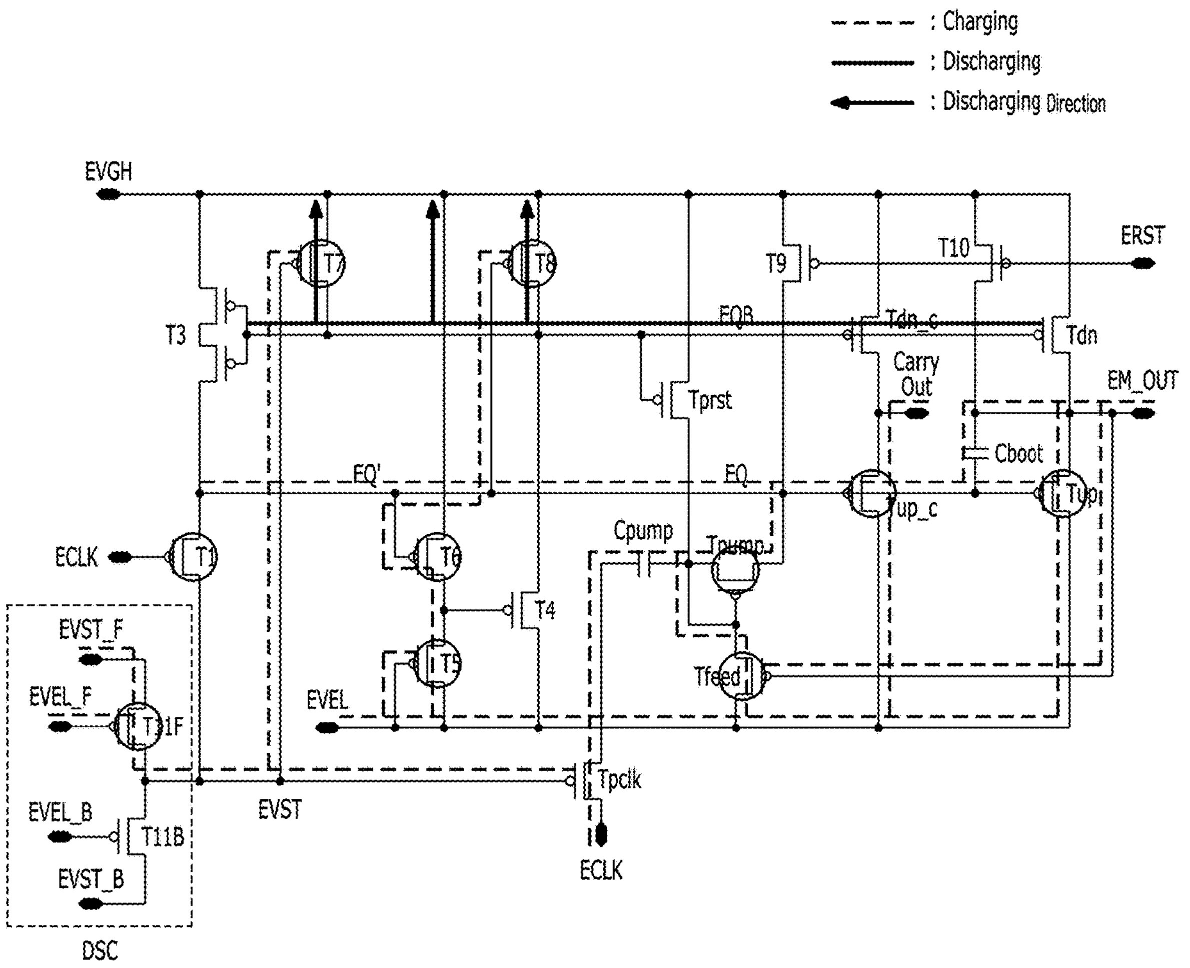
Figure 11B:
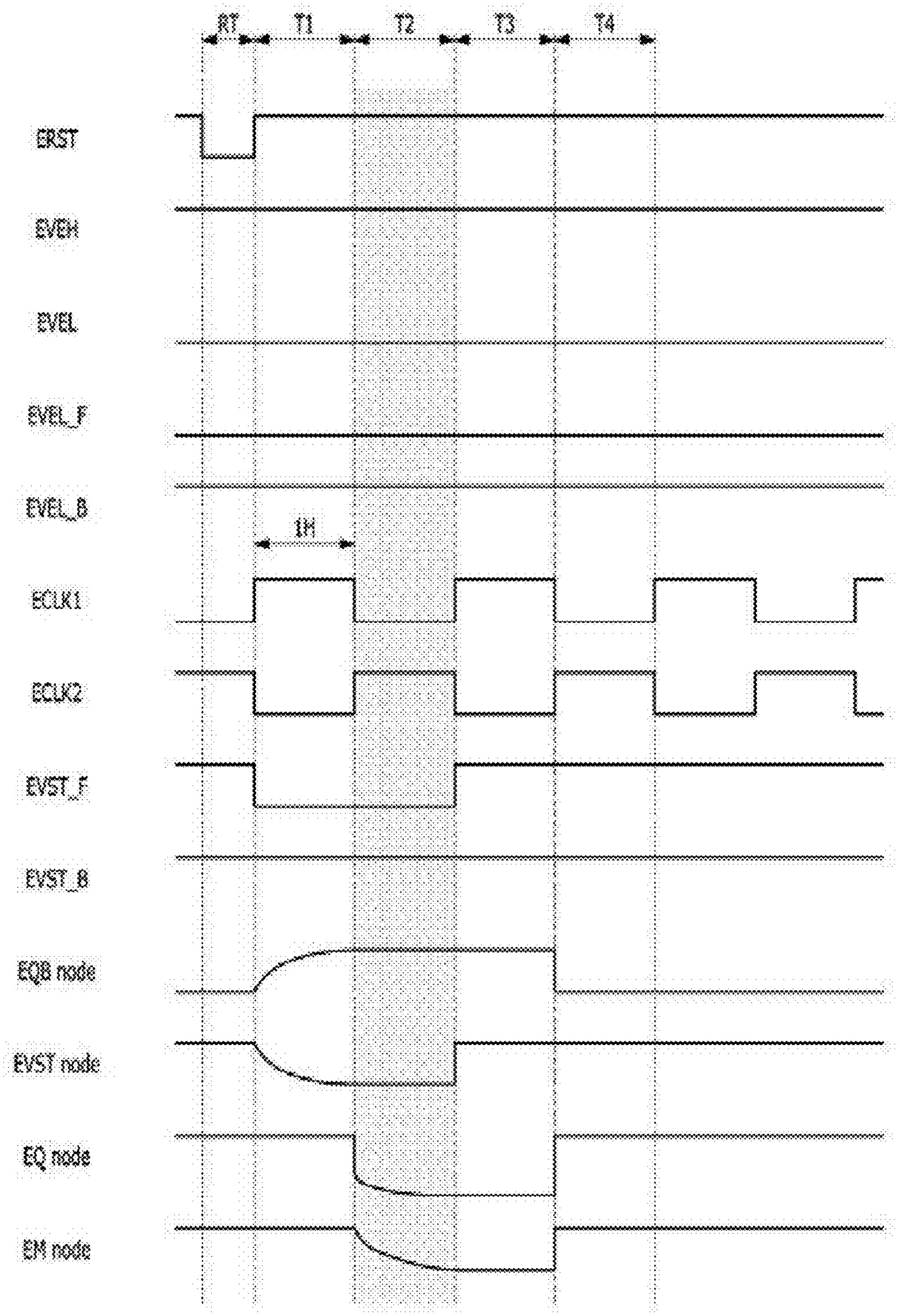

FIGS. 11A and 11B show a driving method and driving waveforms of the emission driving circuit in a second period T2.

Referring to FIGS. 11A and 11B, when the clock signal ECLK is input at a low level in the second period T2, the Q-node EQ is charged at a low level and, as such, the pull-up transistor Tup_c for output of a carry signal Carry and the pull-up transistor Tup for output of an emission signal EM can be turned on. Accordingly, the low drive voltage EVEL can be output through the pull-up transistor Tup_c for output of the carry signal Carry and the pull-up transistor Tup for output of the emission signal EM and, as such, the carry signal Carry and the emission signal EM can be output.

The feed transistor Tfeed can be turned on by an emission signal EM of a turn-on level. When the feed transistor Tfeed is turned on, the low drive voltage EVEL can be applied to the gate node of the pump transistor Tpump. The voltage level of the low drive voltage EVEL can be a level for turning on the pump transistor Tpump.

As the pump transistor Tpump is turned on, the pump capacitor Cpump can be electrically connected to the Q-node EQ. For example, the pump capacitor Cpump and the Q-node EQ can be coupled to each other.

Since the clock transistor Tpclk is in a turn-on state in this case, the Q-node EQ can be boosted in accordance with a cycle of the clock signal ECLK. During a period in which the emission signal EM of the turn-on level is output, the voltage level of the Q-node EQ can be stably maintained at a level for turning on the pull-up transistor Tup. As a result, output of the emission signal EM of the turn-on level can be stably maintained during an emission period.

The QB-node EQB can be maintained in a state of having been discharged at a high level.

Figure 12A:
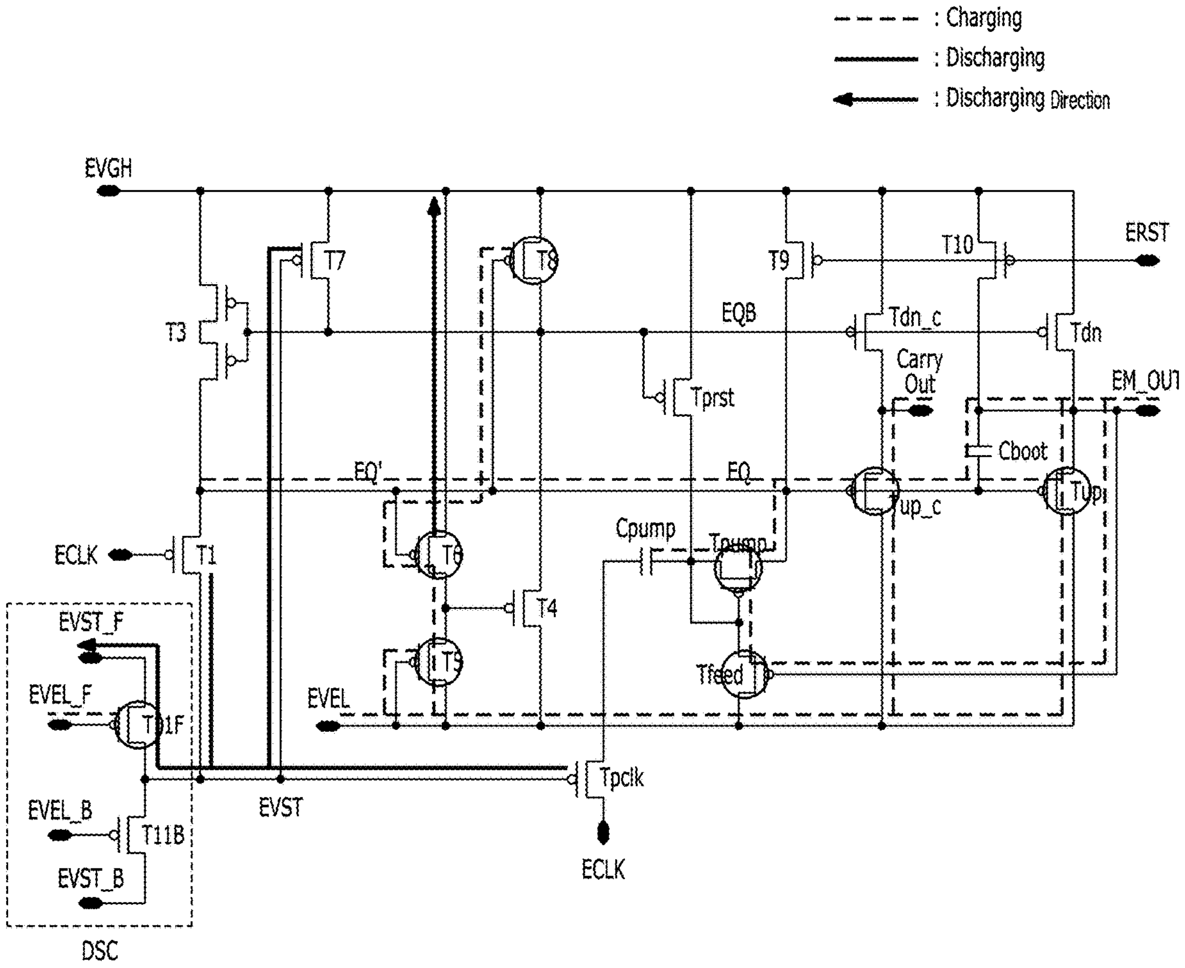
Figure 12B:
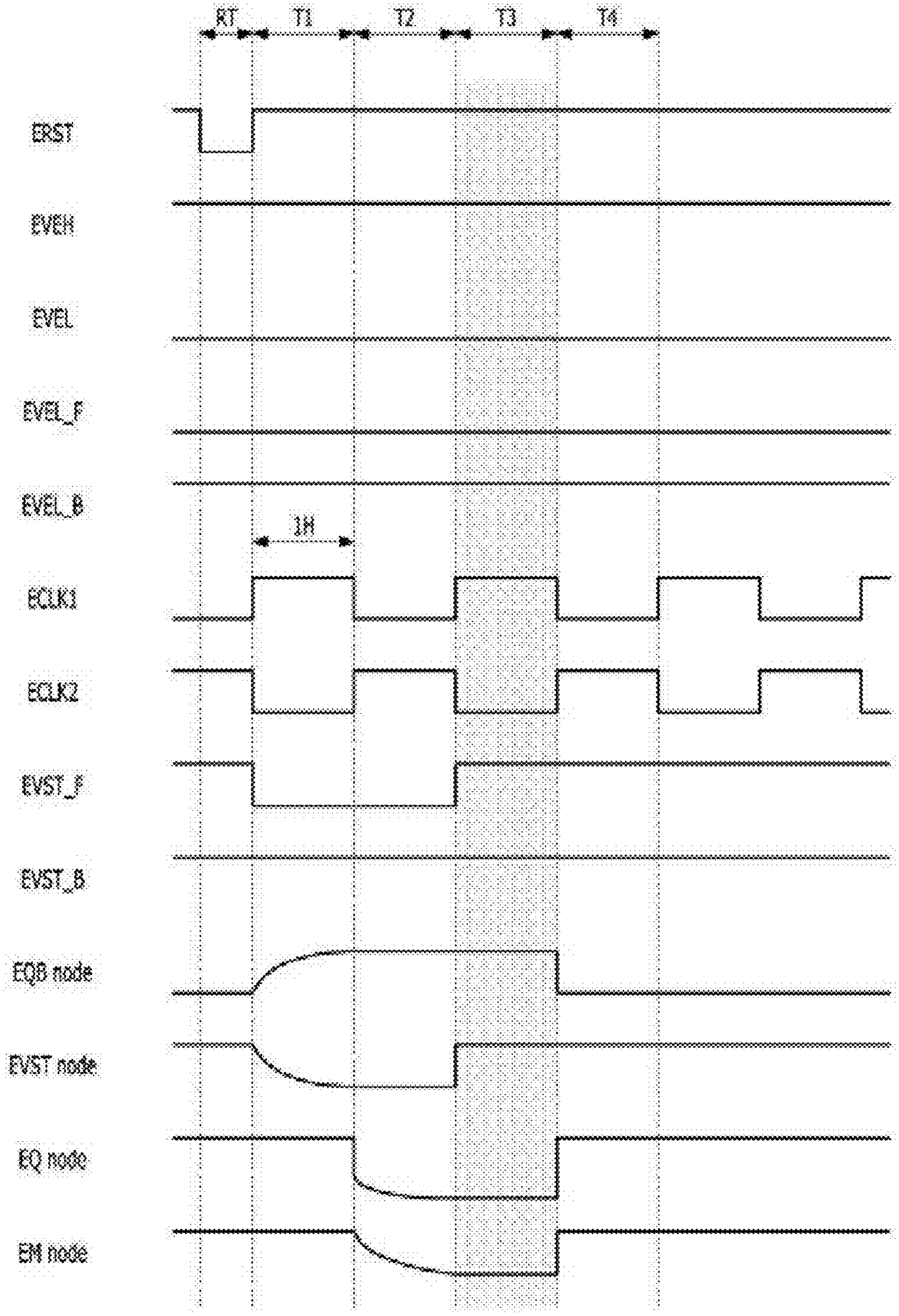

FIGS. 12A and 12B show a driving method and driving waveforms of the emission driving circuit in a third period T3.

When the forward start signal EVST_F transitions to a high level, for example, a turn-off level, the start signal input node EVST is discharged and, as such, transitions to a high level.

The carry signal Carry and the emission signal EM can be output, and the QB-node EQB can be maintained at a state of having been discharged at a high level.

Figure 13A:
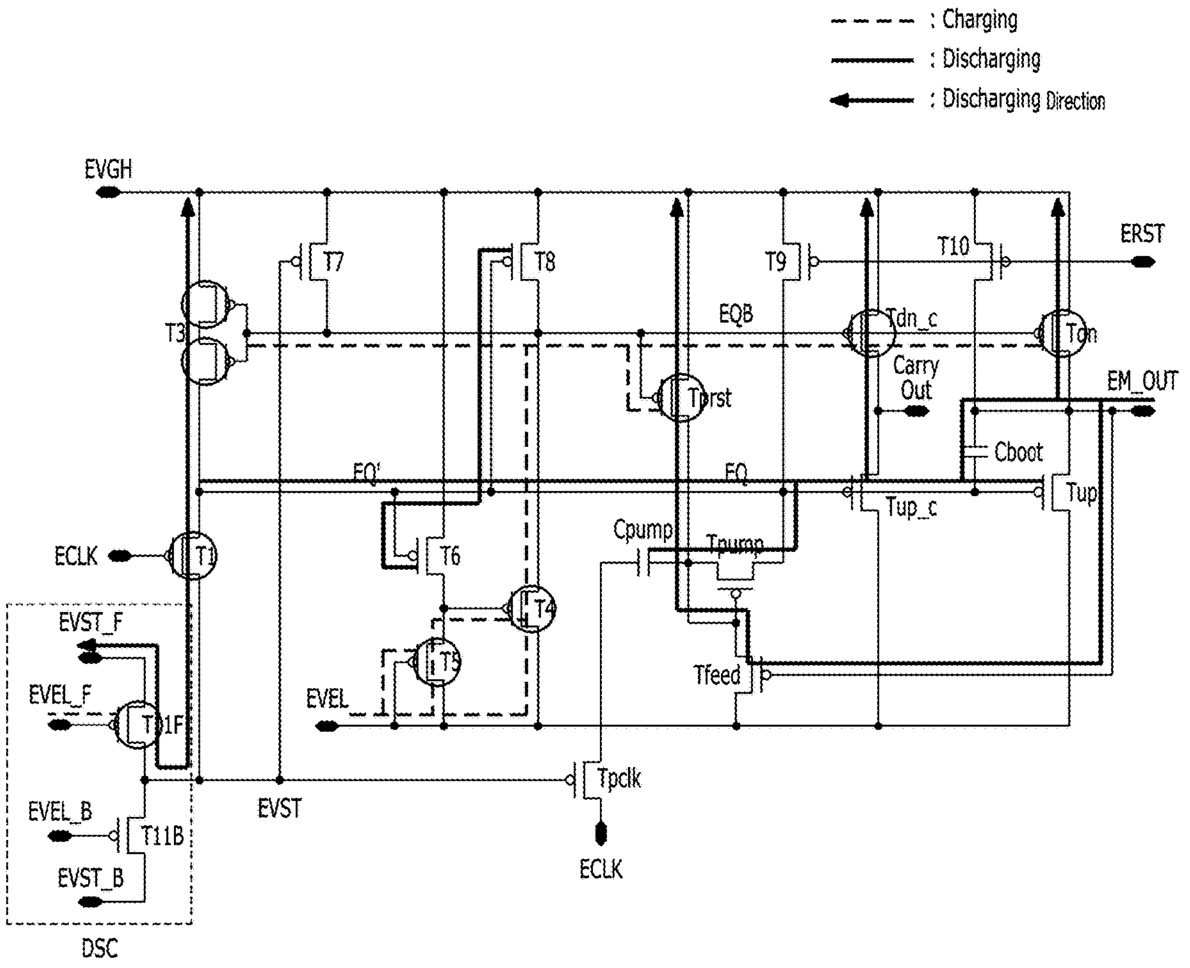
Figure 13B:
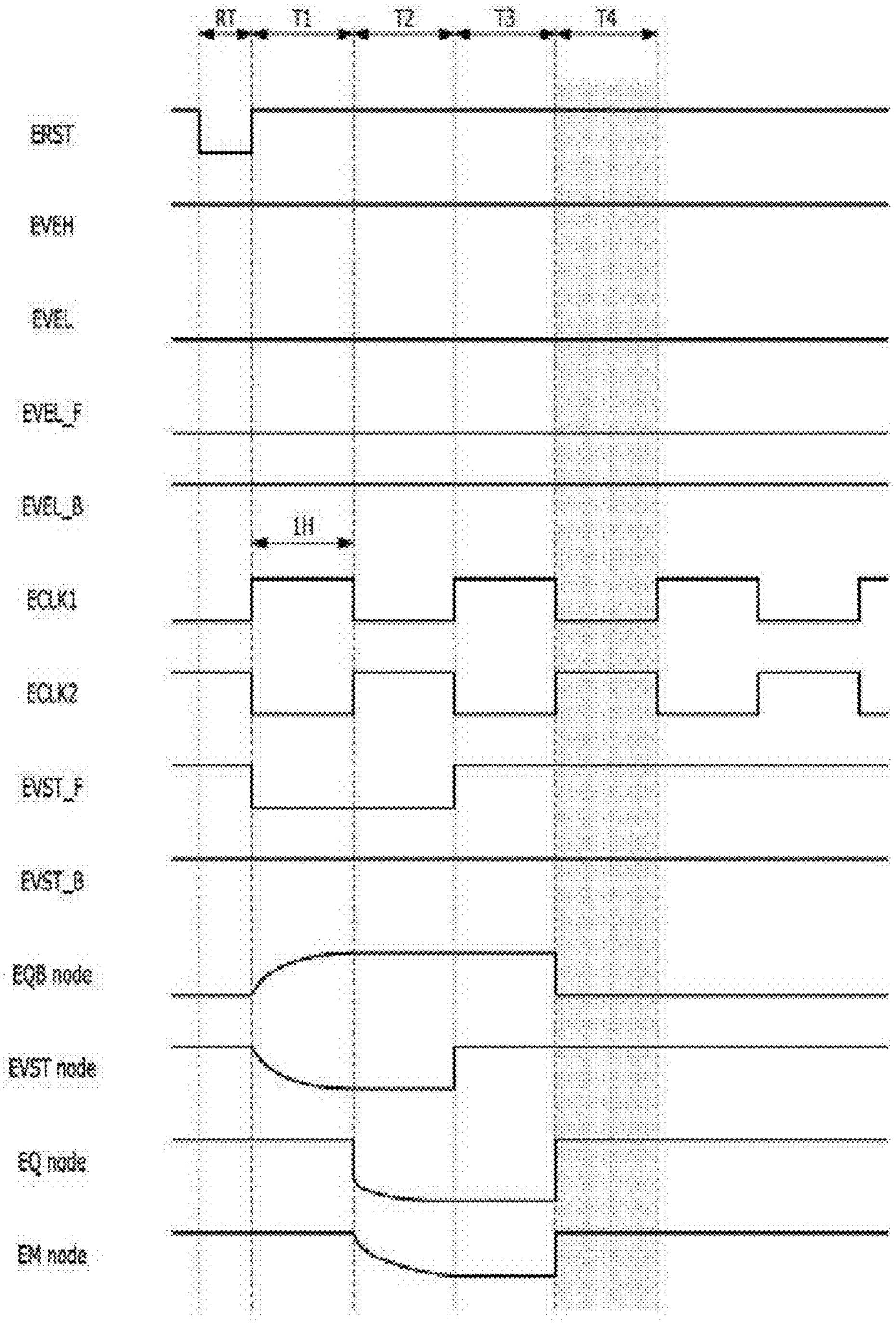

FIGS. 13A and 13B show a driving method and driving waveforms of the emission driving circuit in a fourth period T4.

Referring to FIGS. 13A and 13B, when the clock signal ECLK is input at a low level in the fourth period T4, the Q-node EQ can be discharged at a high level, and the QB-node EQB can be charged at a low level. Accordingly, the pull-up transistor Tup_c for output of a carry signal Carry and the pull-up transistor Tup for output of an emission signal EM can be turned off, whereas the pull-down transistor Tdn_c for output of a carry signal Carry and the pull-down transistor Tdn for output of an emission signal EM can be turned on. Accordingly, a carry signal Carry of a turn-off level and an emission signal EM of a turn-off level can be output.

Since the emission signal EM of the turn-off level is applied to the gate node of the feed transistor Tfeed, the feed transistor Tfeed can also be turned off. Since an emission control start signal EVST of a turn-off level is supplied, the clock transistor Tpclk can also be turned off.

In accordance with a voltage level of the QB-node EQB, the reset transistor Tprst can be turned on. As the high drive voltage EVGH is supplied to the gate node of the pump transistor Tpump through the reset transistor Tprst, the pump transistor Tpump can be turned off.

The pump capacitor Cpump may not operate during a period in which the emission signal EM of the turn-off level is output.

Thus, it can be possible to stably maintain a voltage level of the Q-node EQ through the pump capacitor Cpump configured to operate in accordance with the emission signal EM of the turn-on level during a period in which the emission signal of the turn-on level is output.

Figure 14:
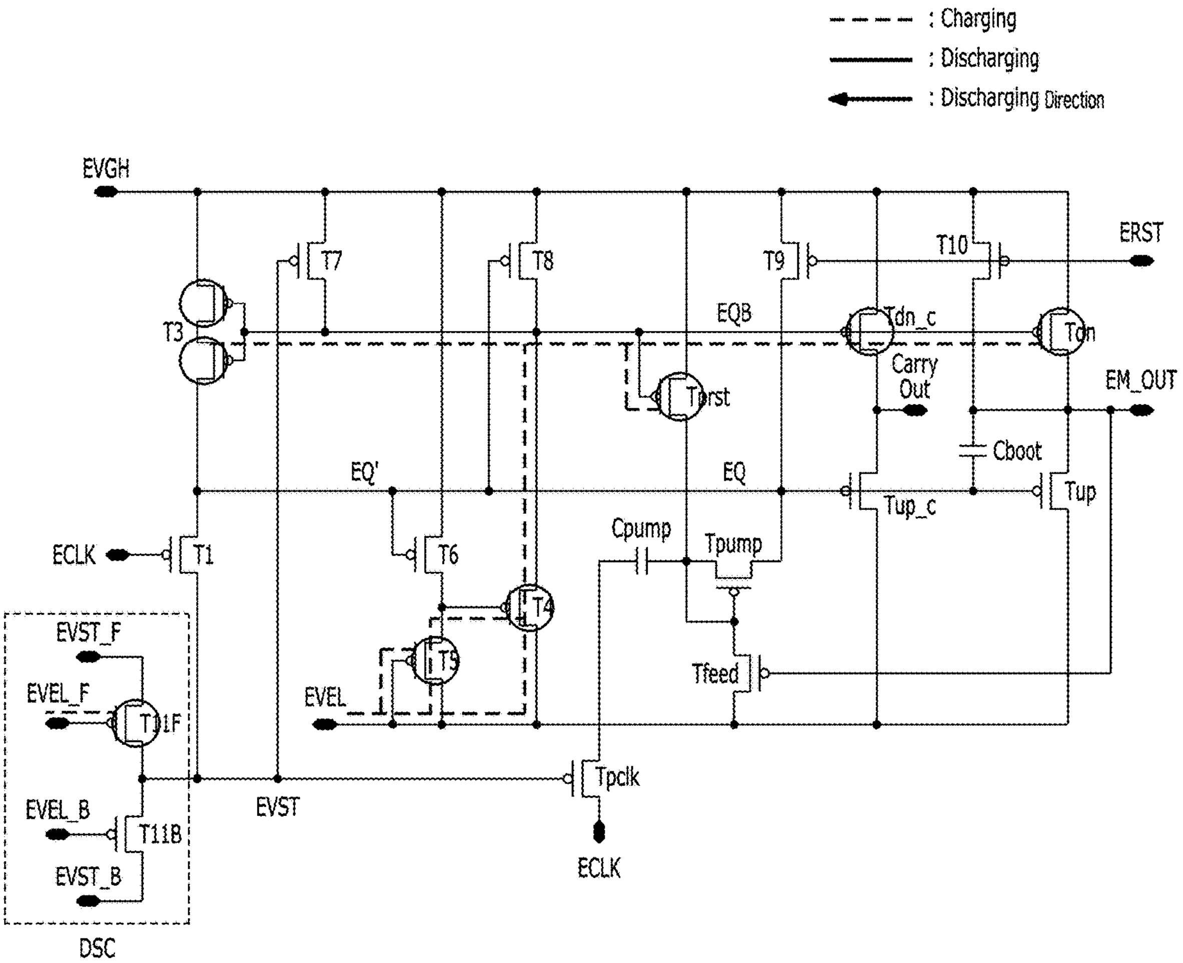

FIG. 14 shows a driving method of the emission driving circuit after the fourth period T4.

Referring to FIG. 14, after the fourth period T4, the Q-node EQ is maintained at a high level, and the QB-node EQB is maintained at a low level. Accordingly, even when the clock signal ECLK is input, the pull-down transistor Tdn_c and the pull-down transistor Tdn for output of a carry signal Carry are maintained in a turn-on state and, as such, a carry signal Carry of a turn-off level and an emission signal EM of a turn-off level can be supplied.

Heretofore, the driving method of the emission driving circuit according to the first aspect of the present disclosure has been described with reference to FIGS. 9A to 14 illustrating a driving method of the emission driving circuit in forward driving in which the emission driving circuit is sequentially driven from the first stage GS1 to the N-th stage GS(N), thereby outputting an emission signal EM. Of course, it can be possible to output an emission signal EM in a backward direction from the N-the stage GS(N) to the first stage GS1 by maintaining the forward low voltage EVEL_F at a high level, maintaining the backward low voltage EVEL_B at a low level, and applying a backward start signal EVST_B having a low voltage.

In backward driving, the forward low voltage EVEL_F is maintained at a high level, and the backward low voltage EVEL_B is maintained at a low level, and, as such, in the direction selection circuit DSC, the forward direction selection transistor T11F can be always maintained in a turn-off state, and the backward direction selection transistor T11B can be maintained in a turn-on state. In backward driving of the emission driving circuit, the backward direction selection transistor T11B is turned on by the backward low voltage EVEL_B, thereby applying a backward start signal EVST_B of a low level to the start signal input node EVST. Accordingly, an emission signal EM can be output.

In accordance with the gate driving circuit according to the first aspect of the present disclosure, it can be possible to provide a gate driving circuit capable of being bidirectionally driven only through addition of the direction selection circuit DSC configured to select forward driving and backward driving using the forward low voltage EVEL_F, the backward low voltage EVEL_B, the forward start signal EVST_F, and the backward start signal EVST_B while having a simple circuit configuration.

Figure 15:
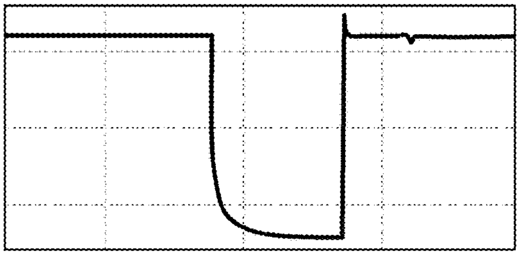
FIG. 15 shows graphs of results of simulation of emission driving circuits respectively included in the gate driver according to the first aspect of the present disclosure and a gate driver according to a comparative example.
Figure 15:
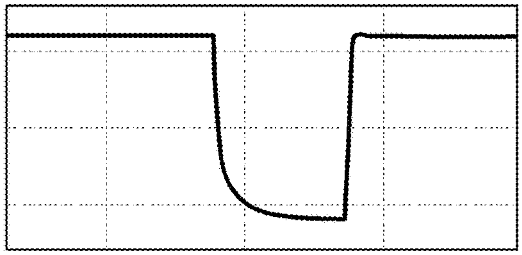
Figure 15:
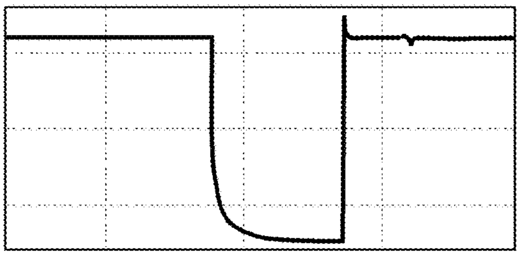
Figure 15:
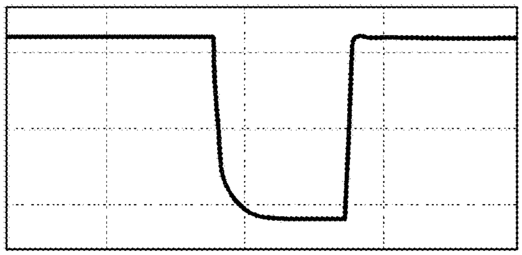

FIG. 15 shows graphs depicting results of simulation of the emission driving circuit included in the gate driver according to the first aspect of the present disclosure and an emission driving circuit included in a gate driver according to a comparative example.

Referring to FIG. 15, the graph of the comparative example depicts results of simulation of voltage variation of a Q-node and output voltage variation of an emission signal EM when the emission signal EM is output using a conventional emission driving circuit.

The graph of the first aspect depicts results of simulation of voltage variation of the Q-node and output voltage variation of an emission signal EM when the emission signal EM is output using the emission driving circuit including the direction selection circuit DST according to the first aspect of the present disclosure.

In accordance with results of simulation, it can be seen that the case in which an emission signal is output using the conventional emission driving circuit and the case in which an emission signal is output using the emission driving circuit according to the first aspect of the present disclosure exhibit substantially the same Q-node voltage variation and the same emission signal output voltage variation.

For example, it can be seen that bidirectional driving can be possible while maintaining the same performance as that of the conventional case only through addition of the direction selection circuit DSC capable of selecting forward driving and backward driving using the forward low voltage EVEL_F, the backward low voltage EVEL_B, the forward start signal EVST_F, and the backward start signal EVST_B while having a simple circuit configuration.

Figure 16:
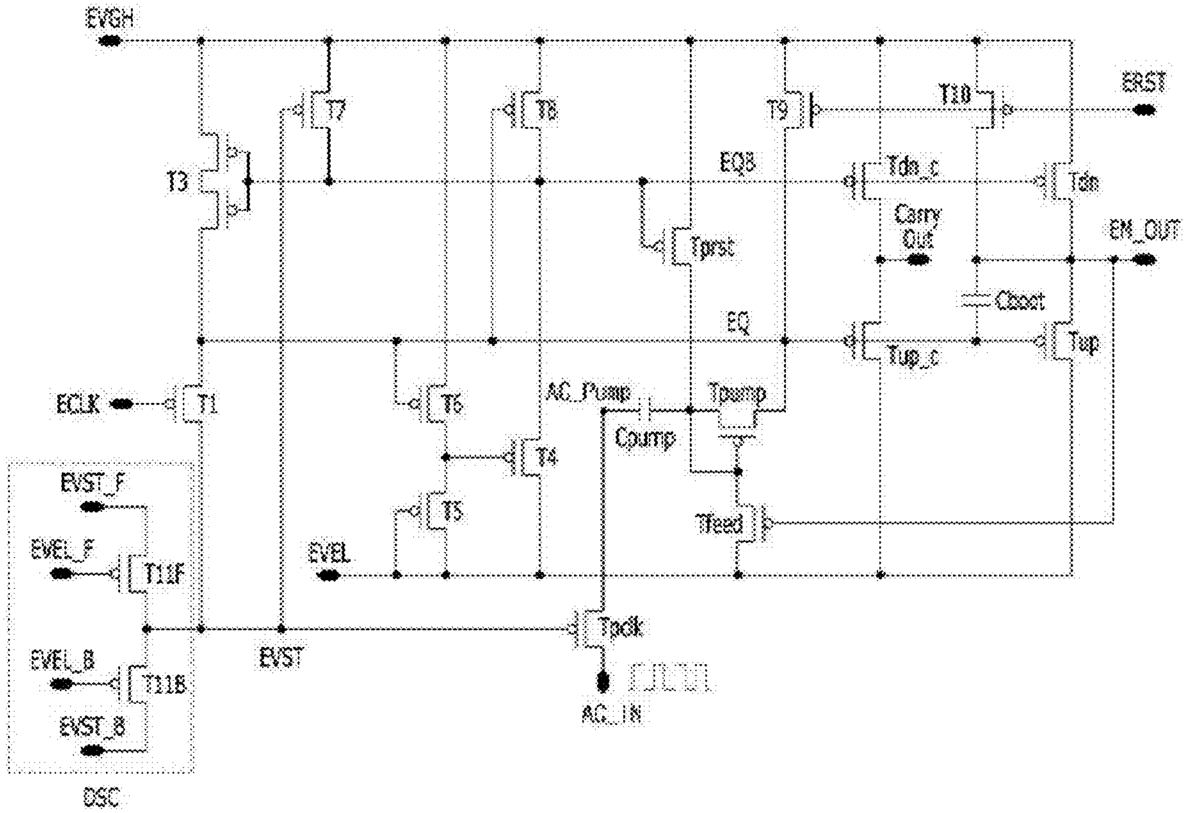
FIG. 16 is a diagram illustrating an emission driving circuit included in a gate driver according to a second aspect of the present disclosure.
Figure 17:
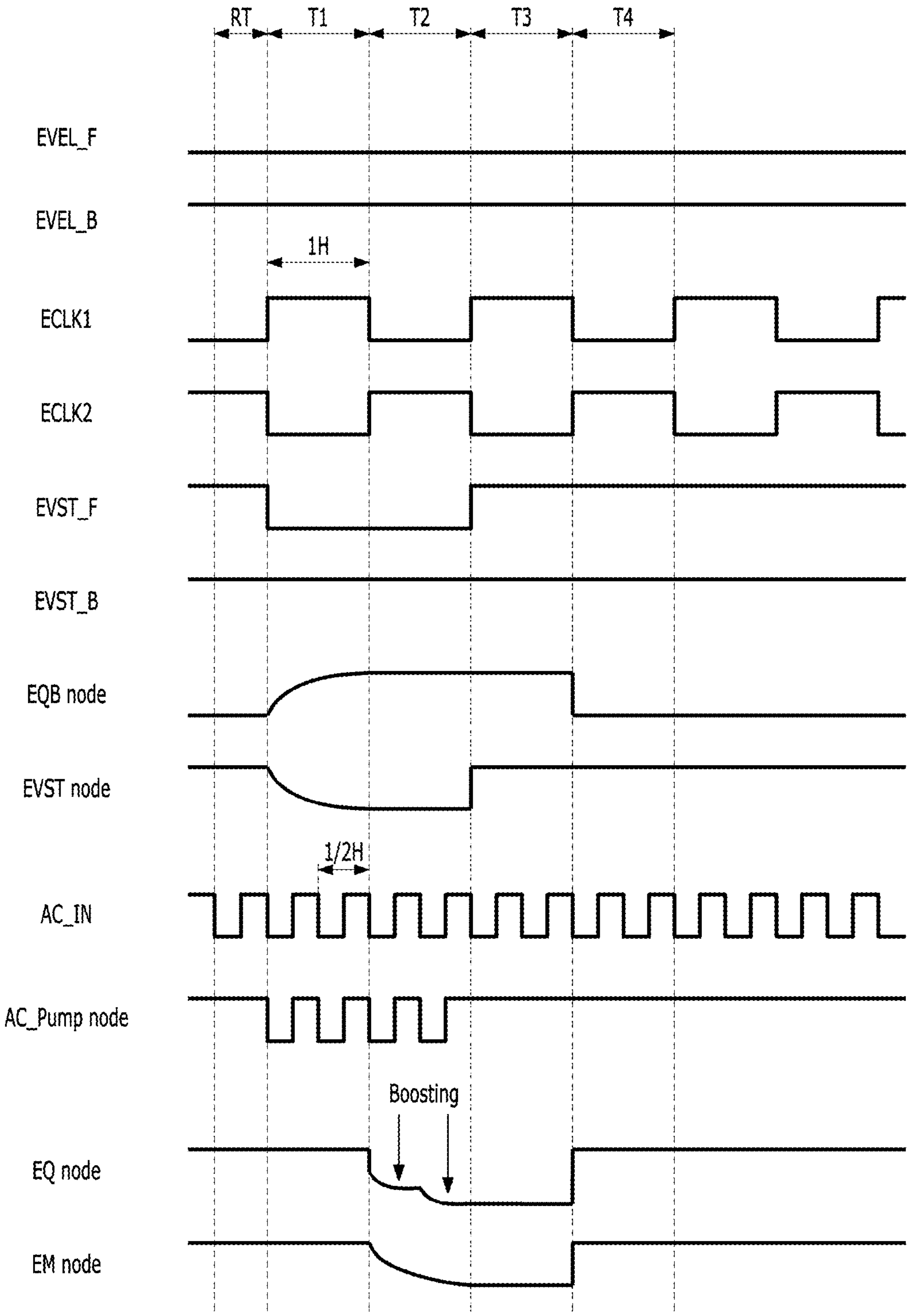
FIG. 17 is a diagram illustrating driving timings of the emission driving circuit of FIG. 16.

FIG. 16 is a diagram illustrating an emission driving circuit included in a gate driver according to a second aspect of the present disclosure. FIG. 17 is a diagram illustrating driving timings of the emission driving circuit of FIG. 16.

Referring to FIGS. 16 and 17, the emission driving circuit included in the gate driver according to the second aspect of the present disclosure is different from the emission driving circuit according to the first aspect in that an AC signal AC_IN is input to a clock transistor Tpclk in place of the clock signal ECLK.

In the emission driving circuit according to the second aspect, the clock transistor Tpclk can be electrically connected between a pump capacitor Cpump and an input terminal for the AC signal AC_IN. The clock transistor Tpclk can be turned on/off in accordance with a voltage level of a start signal input node EVST. For example, when the voltage level of the start signal input node EVST is a low level, for example, a turn-on level, the clock transistor Tpclk can be turned on, thereby applying the AC signal AC_IN to an AC pump node AC_Pump to which the pump capacitor Cpump is connected.

The AC signal AC_IN can be applied to the AC pump node AC_Pump when the voltage level of the start signal input node EVST is a turn-on level of the clock transistor Tpclk, thereby boosting a voltage of a Q-node EQ. The AC signal AC_IN as described above can be a pulse signal having a predetermined cycle and a predetermined magnitude. In order to boost the voltage of the Q-node EQ, the AC signal AC_IN can be set to have a cycle shorter than a charging cycle using the clock signal ECLK. The pulse signal alternates between a first level and a second level, and charging is performed for a period in which a lower one of the first and second levels is maintained. When it is assumed that a charging cycle is 1H with reference to the clock signal ECLK, the AC signal AC_IN can be set to have a cycle of 1/NH (N being a multiple of 2), for example, ½H, ¼H, ⅙H, . . . . For example, a charging operation can be performed several times within the same period to boost the voltage of the Q-node EQ.

The waveform diagram of FIG. 17 illustrates the case in which a charging cycle using the AC signal AC_IN is ½H. Accordingly, a voltage for charging can be applied two times to the AC pump node AC_Pump for a period of 1H. In charging, boosting can be performed in a charging period, for example, when the start signal input node EVST has a low level in accordance with application of a forward low voltage EVEL_F of a low level, and the AC signal of the AC pump node AC_Pump also has a low level in a state in which the clock signal ECLK has a low level. Since an AC signal AC_IN of a low level is applied two times to the AC pump node AC_Pump for a period of T2 in which the clock signal ECLK has a low level, the Q-node EQ can be boosted two times. Here, the cycle of the AC signal AC_IN can be diversely set and, as such, boosting can be performed multiple times for the charging period of 1H when the AC signal AC_IN is set to have a shorter cycle. Accordingly, coupling can be performed multiple times through boosting by the AC signal AC_IN even in a mode in which the width of the emission signal (EM Width) is small and, as such, output characteristics of the emission signal can be enhanced. In addition, it can be possible to avoid generation of mura at low grayscales (for example, 16 Gray or less) and formation of a horizontal line caused by ripple of a high drive voltage EVDD.

Figure 18:
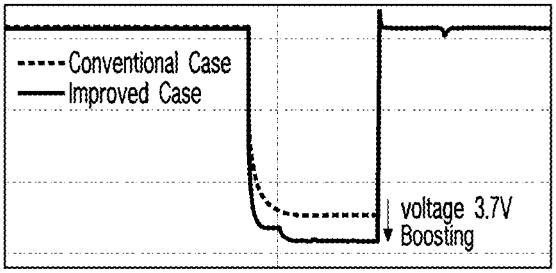
FIG. 18 shows graphs of results of simulation of emission driving circuits respectively included in the gate driver according to the second aspect of the present disclosure and a gate driver according to a comparative example.
Figure 18:
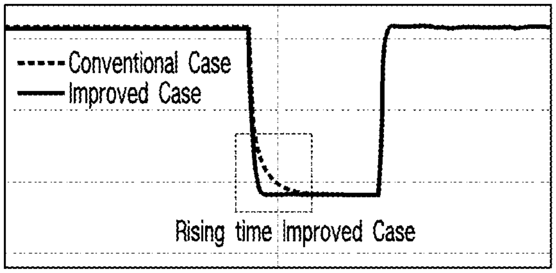

FIG. 18 shows graphs depicting results of simulation of the emission driving circuit included in the gate driver according to the second aspect of the present disclosure and an emission driving circuit included in a gate driver according to a comparative example. Each graph depicts results of simulation of voltage variation of a Q-node and output voltage variation of an emission signal EM.

Referring to FIG. 18, in accordance with results of simulation of voltage variation of a Q-node, it can be seen that, in the case in which an emission signal EM is output in a boosted manner using the AC signal AC_IN according to the second aspect of the present disclosure, a voltage of the Q-node is boosted to be lower than that of the comparative example by about 3.7 V.

In accordance with results of simulation of output voltage variation of an emission signal EM, it can be seen that, in the case in which an emission signal EM is output in a boosted manner using the AC signal AC_IN according to the second aspect of the present disclosure, the emission signal EM reaches a target voltage at an earlier time than that of the comparative example and, as such, an enhancement in rising time is achieved.

As apparent from the above description, aspects of the present disclosure have the following effects.

In accordance with aspects of the present disclosure, it can be possible to provide a gate driving circuit capable of maximizing design area efficiency by reducing a design area through simplification of the gate driving circuit while securing desired performance of the gate driving circuit, and to provide a display device including the gate driving circuit.

In accordance with aspects of the present disclosure, it can be possible to provide a display device capable of maximizing design area efficiency while reducing manufacturing costs by providing a gate driving circuit capable of being bidirectionally driven through a simple circuit configuration.

In accordance with aspects of the present disclosure, it can be possible to easily implement a tiling display device while reducing a bezel area of a display panel thereof by disposing a gate driving circuit capable of being bidirectionally driven in an active area of the display panel through a simple circuit configuration.

Effects according to the example aspects of the disclosure are not limited to the above-illustrated contents, and more various effects can be included in the disclosure.

Although the foregoing description has been given mainly in conjunction with aspects, these aspects are only illustrative without limiting the disclosure. Those skilled in the art to which the present disclosure pertains can appreciate that various modifications and applications illustrated in the foregoing description can be possible without changing essential characteristics of the aspects. Therefore, the above-described aspects should be understood as example rather than limiting in all aspects. In addition, the scope of the present disclosure should also be interpreted by the claims below rather than the above detailed description. All modifications or alterations as would be derived from the equivalent concept intended to be included within the scope of the present disclosure should also be interpreted as falling within the scope of the disclosure.

What is claimed is:

1. A display device comprising:

a display panel including a plurality of sub-pixels disposed thereon; and a gate driving circuit configured to output a gate signal to the plurality of sub-pixels, wherein the gate driving circuit comprises:

a pull-up transistor controlled by a voltage level of a Q-node;

a pull-down transistor configured by a voltage level of a QB-node;

a pump capacitor electrically connected between the Q-node and an input terminal for an AC signal;

a pump transistor electrically connected between the pump capacitor and the Q-node and controlled by the gate signal output to a gate line;

a clock transistor electrically connected between the pump capacitor and the input terminal for the AC signal and controlled by a voltage level of a start signal input node;

a first transistor electrically connected between the Q-node and the start signal input node and controlled by a voltage level of a clock signal;

a direction selection circuit configured to output a forward start signal or a backward start signal to the start signal input node; and a feed transistor including a gate connected to an output terminal from which the gate signal is output, a first electrode connected to a gate of the pump transistor, and a second electrode connected to an input terminal for a low drive voltage, and wherein the AC signal has a cycle corresponding to 1/N of a cycle of the clock signal, where N is a multiple of 2.

2. The display device according to claim 1, wherein the direction selection circuit applies the forward start signal to the start signal input node when a forward low voltage is input thereto, and applies the backward start signal to the start signal input node when a backward low voltage is input thereto.

3. The display device according to claim 2, wherein the direction selection circuit comprises:

a forward direction selection transistor connected between a line for the forward start signal and the start signal input node, the forward direction selection transistor comprising a gate configured to receive the forward low voltage; and a backward direction selection transistor connected between a line for the backward start signal and the start signal input node, the backward direction selection transistor comprising a gate configured to receive the backward low voltage.

4. The display device according to claim 1, wherein a gate node of the pump transistor is electrically connected to a node between the pump transistor and the pump capacitor.

5. The display device according to claim 1, wherein the display panel comprises a substrate on which the gate driving circuit is disposed at least one in number among pixel areas formed with the plurality of sub-pixels.

6. The display device according to claim 1, wherein each of the plurality of sub-pixels comprises:

a light emitting element;

a driving transistor configured to supply a drive current to the light emitting element; and a plurality of switching transistors configured to control driving timings of the driving transistor and the light emitting element, and wherein the gate signal is supplied to control, among the plurality of plurality of switching transistor, a switching transistor configured to control a turn-on period of the light emitting element.

7. A gate driving circuit comprising:

a pull-up transistor controlled by a voltage level of a Q-node, and electrically connected between an input terminal for a low drive voltage and an output terminal for a gate signal;

a pull-down transistor controlled by a voltage level of a QB-node, and electrically connected between an input terminal for a high drive voltage and the output terminal for the gate signal;

a pump capacitor electrically connected between the Q-node and an input terminal for an AC signal;

a pump transistor electrically connected between the pump capacitor and the Q-node and controlled by the gate signal output to a gate line;

a clock transistor electrically connected between the pump capacitor and the input terminal for the AC signal, and controlled by a voltage level of a start signal input node;

a first transistor electrically connected between the Q-node and the start signal input node, and controlled by a voltage level of a gate clock signal;

a direction selection circuit configured to output a forward start signal or a backward start signal to the start signal input node; and a feed transistor including a gate connected to an output terminal from which the gate signal is output, a first electrode connected to a gate of the pump transistor, and a second electrode connected to the input terminal for the low drive voltage, and wherein the AC signal has a cycle corresponding to 1/N of a cycle of the gate clock signal, where N is a multiple of 2.

8. The gate driving circuit according to claim 7, wherein the direction selection circuit comprises:

a forward direction selection transistor connected between a line for the forward start signal and the start signal input node, the forward direction selection transistor comprising a gate configured to receive a forward low voltage; and a backward direction selection transistor connected between a line for the backward start signal and the start signal input node, the backward direction selection transistor comprising a gate configured to receive a backward low voltage.

9. A display device comprising:

a display panel including a plurality of sub-pixels disposed thereon; and a gate driving circuit configured to output a gate signal to the plurality of sub-pixels, wherein the gate driving circuit comprises:

a pull-up transistor controlled by a voltage level of a Q-node;

a pull-down transistor configured by a voltage level of a QB-node;

a pump capacitor electrically connected between the Q-node and an input terminal for an AC signal;

a pump transistor electrically connected between the pump capacitor and the Q-node and controlled by the gate signal output to a gate line;

a clock transistor electrically connected between the pump capacitor and the input terminal for the AC signal and controlled by a voltage level of a start signal input node;

a first transistor electrically connected between the Q-node and the start signal input node and controlled by a voltage level of a clock signal;

a direction selection circuit configured to output a forward start signal or a backward start signal to the start signal input node; and a feed transistor including a gate connected to an output terminal from which the gate signal is output, a first electrode connected to a gate of the pump transistor, and a second electrode connected to an input terminal for a low drive voltage, and wherein the AC signal has a cycle corresponding to 1/N of a cycle of the clock signal, where N is a multiple of 2.

10. The display device according to claim 9, wherein the direction selection circuit comprises:

a forward direction selection transistor connected between a line for the forward start signal and the start signal input node, the forward direction selection transistor comprising a gate configured to receive a forward low voltage; and a backward direction selection transistor connected between a line for the backward start signal and the start signal input node, the backward direction selection transistor comprising a gate configured to receive a backward low voltage.

11. The display device according to claim 9, wherein a voltage of the Q-node is boosted when the forward start signal or the backward start signal is applied at a low level, the clock signal is applied at a low level, and the AC signal has a low level.

12. The display device according to claim 9, wherein a voltage level of the Q-node is varied at a time when the AC signal transitions from a high level to a low level.

* * * * *